May 10, 1966  R. E. ROBERSON  3,250,340
HYDROSTATIC DRIVING SYSTEM FOR MOTOR VEHICLE
Filed Sept. 27, 1962  9 Sheets-Sheet 1
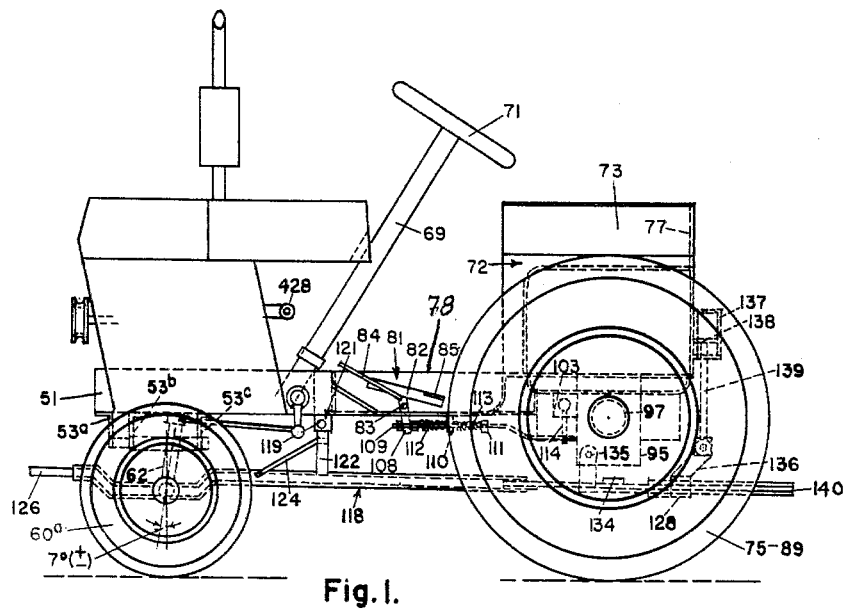
INVENTOR.
Robert E. Roberson,
BY

May 10, 1966

R. E. ROBERSON 3,250,340

HYDROSTATIC DRIVING SYSTEM FOR MOTOR VEHICLE

Filed Sept. 27, 1962

INVENTOR.
Robert E. Roberson,
BY *Thos. A. Deming* Atty.

INVENTOR.
Robert E. Roberson,
BY [signature] Atty.

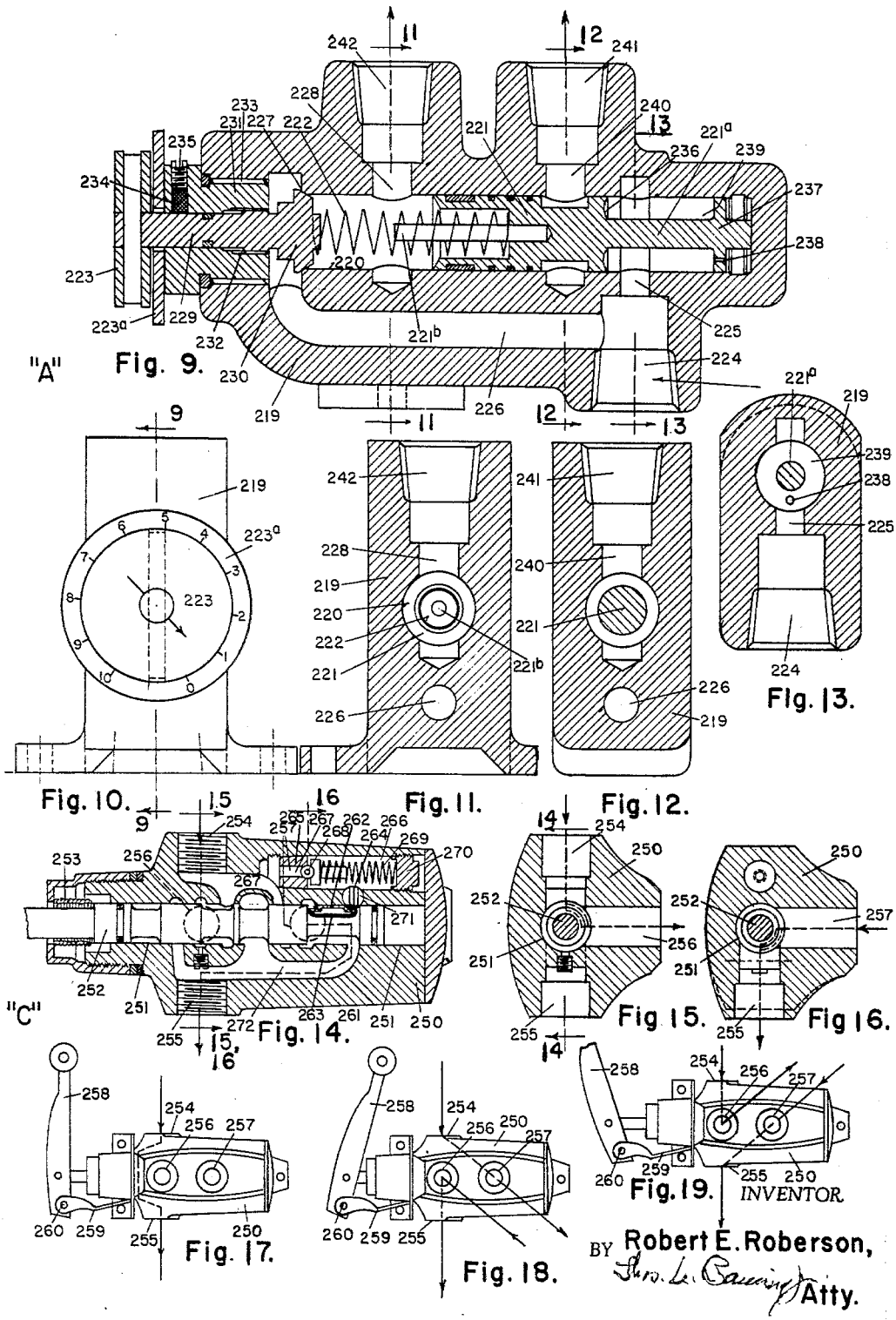

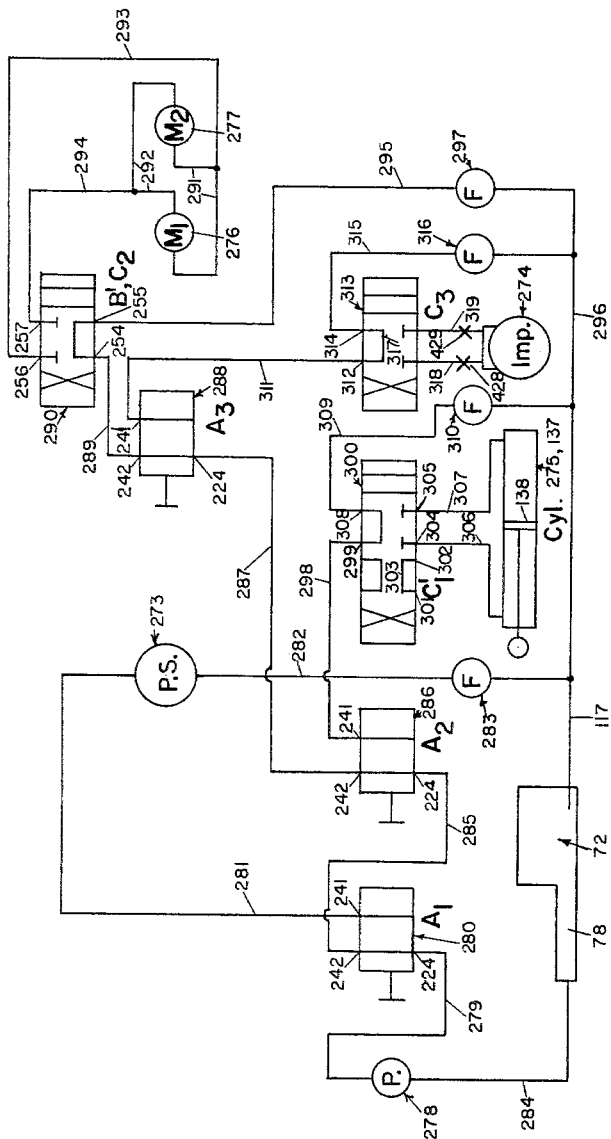

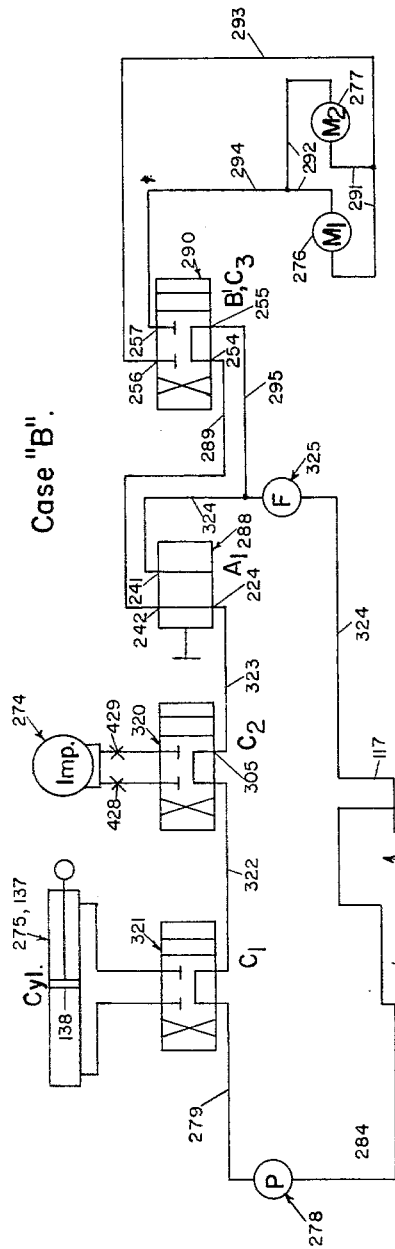
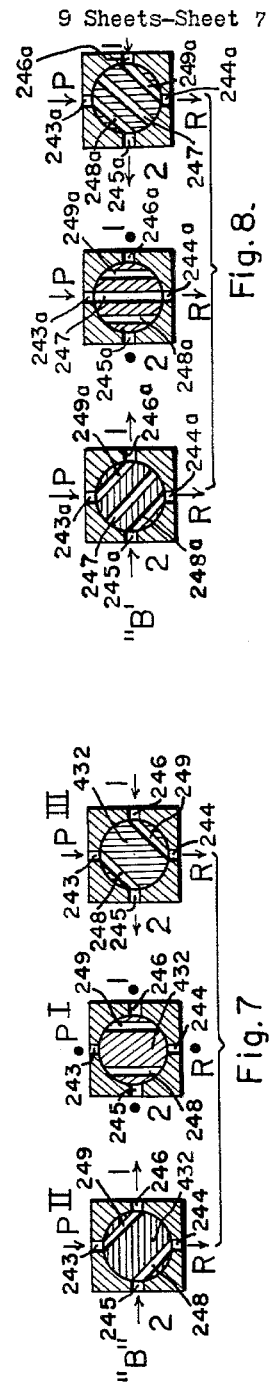

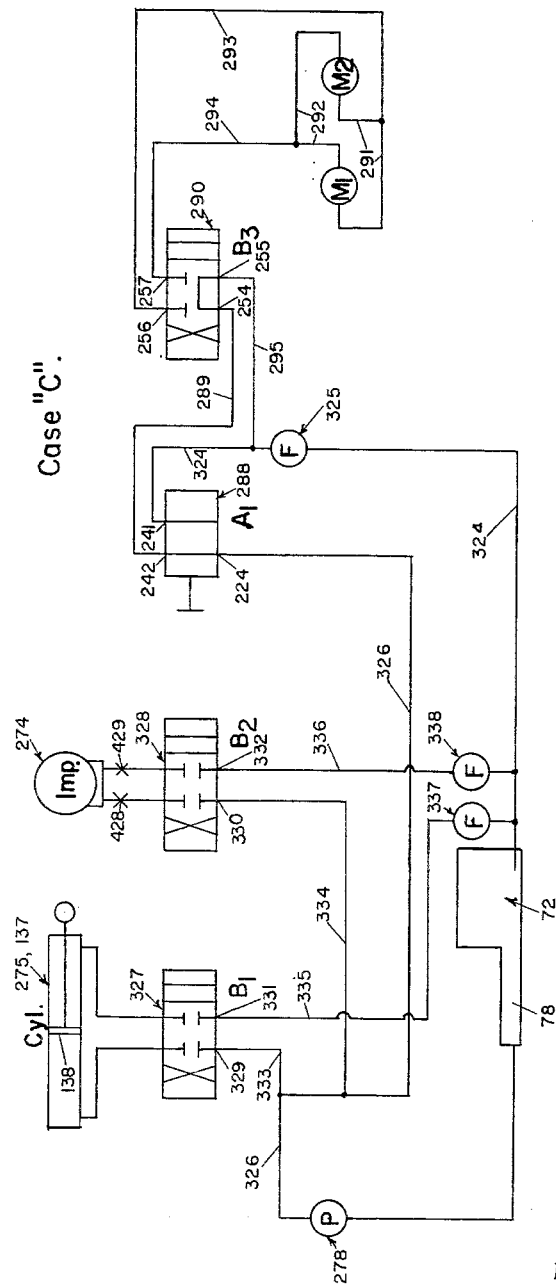

May 10, 1966  R. E. ROBERSON  3,250,340
HYDROSTATIC DRIVING SYSTEM FOR MOTOR VEHICLE
Filed Sept. 27, 1962  9 Sheets-Sheet 9
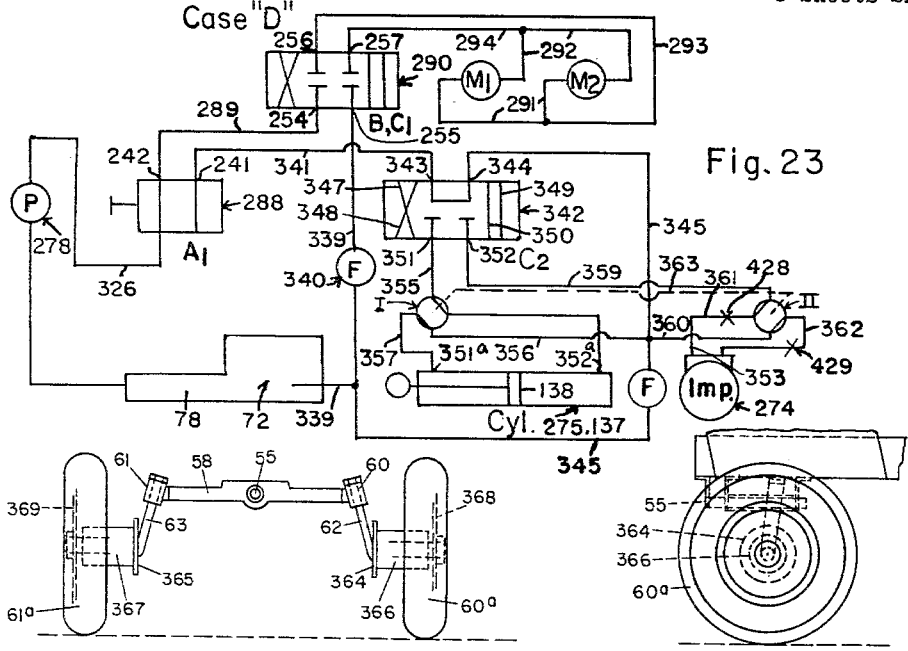
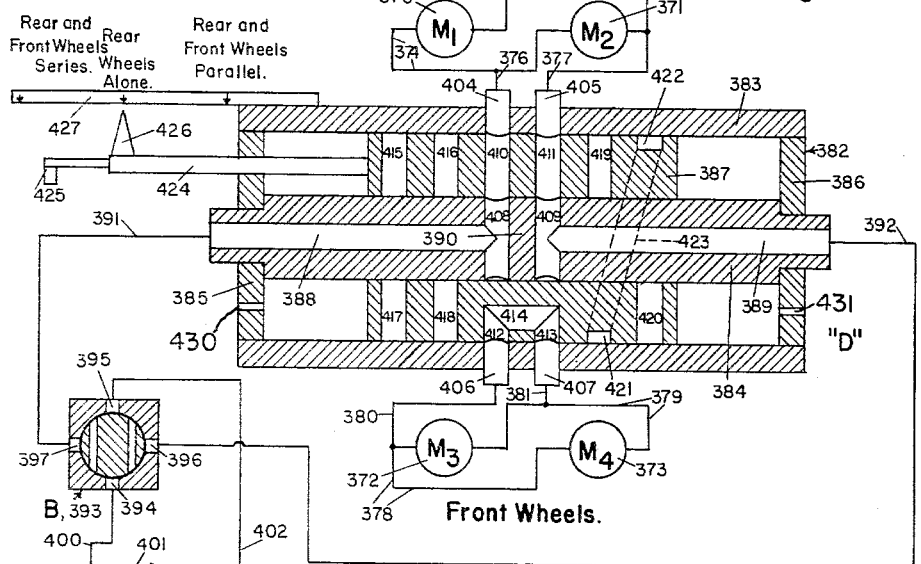
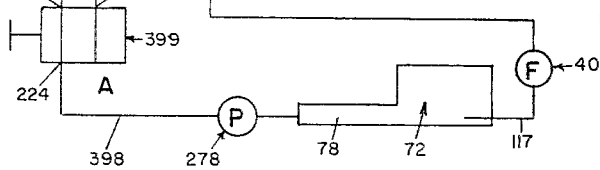
INVENTOR.
Robert E. Roberson,
Atty.

United States Patent Office 3,250,340
Patented May 10, 1966

3,250,340
HYDROSTATIC DRIVING SYSTEM FOR
MOTOR VEHICLE
Robert E. Roberson, 3520 Landwehr Ave.,
Northbrook, Ill.
Filed Sept. 27, 1962, Ser. No. 227,125
28 Claims. (Cl. 180—44)

This invention relates to improvements in motor driven vehicles, and the like. More specifically, the invention concerns itself with improvements in tractor units primarily intended for relatively light traction operations, such as, for the driving of implements used in light agricultural operations; for gardening operations, such as grass cutting, snow removal, soil levelling, and the like; but it will presently appear that tractors embodying features of my present invention may also be advantageously used in connection with many other operations.

Broadly considered, the improvements to be hereinafter disclosed concern themselves with the manner of driving the tractor unit, including its control both as to speed and developed traction; and the manner of transmission of the developed traction to the driven implement or implements. Generally speaking I employ high pressure oil as the medium for transmitting the power from the prime mover, such as an internal combustion engine, both to the traction wheels and to such implements as are connected to the tractor for traction purposes when such implement or implements require power for their functioning. Such high pressure oil is delivered to the motors which drive the traction wheels, and to such implements as require operational power for their functioning. Such a unit is a lawn mower; and the return sides of all such driven oil motor units are connected to the intake of the prime-mover driven pump for re-circulation; but such return is through the medium of a tank or receptacle of considerable capacity so that desired cooling of the circulated oil is possible. The details of such arrangements will be disclosed hereinafter; but at this point the following statements are proper.

It is desirable to provide for the maximum required transmission of power (such as is imposed when a maximum traction of the tractor is being developed, together with further demand for power to operate the attached implement); in which case it is evident that a maximum degree of heating of such oil or other liquid medium will occur. It is therefore desired that the cyclic rate at which such medium is passed through the cycle of pumping and driving be slow enough to allow for the needed cooling to occur, but on the contrary it is highly desirable to make provisions such that the above effects may be obtained with provision for use of a minimum total volume of the liquid medium, since the weight of the working unit will thereby be reduced to a minimum, and the costs of operation correspondingly reduced. But it is also desirable to so arrange the needed elements that the weight supplied by such liquid medium shall be advantageously located for best traction conditions. More specifically, these arrangements include the following features.

I have provided a liquid carrying tank over the rear portion of the tractor unit, and of form and location such that it may conveniently be used as the seat for the driver. Thus such tank, together with its contents is well placed to deliver its weight to the rear traction wheels, and to receive from the wheel driving motors the discharged liquid by short and direct connections to such tank. The arrangemnts are also such that the delivered liquid is entered into the tank under conditions which produce circulation of such heated liquid rapidly and close to the outside walls of the tank, so that heat is rapidly dissipated without need of special provision for radiation or convection of the heat from the tank surfaces.

The details of this arrangement will appear hereinafter.

A further and important feature of the invention concerns itself with the provision of a special frame arrangement which comprises the main structural element of the tractor. This arrangement comprises a rather large cross-section tubular extension from the tank forwardly along the medial line of the tractor, to the hood compartment which encloses or houses the prime-mover and pump elements. Such extension is substantially horizontal, and has its rear portion just below the floor of the tank and securely connected to the tank floor; an opening is provided in the tank floor to establish free flow of the liquid from the tank to such extension; and the connection of the extension to the tank is liquid tight to prevent loss of contained liquid to the outside of the tank and extension at the location of such connection. Thus such extension provides additional liquid receiving and carrying capacity without need of correspondingly enlarging the size of the tank itself. This extension element is of sheet metal of rectangular cross-section and of gage sufficient to provide the needed frame stiffness without provision of other frame elements between the front and rear wheel journals. Thus a double benefit is attained comprising the enlargement of total capacity of the liquid containers without actual enlargement of the main tank proper, together with elimination of other frame members, and with provision of frame stiffness and strength of the frame where most needed. Such forward extension is of sufficient section to provide great torque resisting strength, to correspondingly meet requirements imposed by the riding of the tractor over rough and uneven ground or other surfaces.

Since the front end of such extension comes to the location of the prime mover housing, I use such extension as a conduit through which the liquid is delivered from the rear tank to the location of such prime mover. Accordingly, further heat radiation and convection is produced from such extension as the liquid travels slowly from the main tank to its point of re-use.

Such extension is tubular and preferably of rectangular section and is substantially level when the tractor stands on level ground, and the extension is located at a level just lower than the tank. The liquid from the tank thus gravitates into the rear end of the extension and flows slowly to the front end where the relatively small conduit for supply of fluid to the pump connects to the front end of such tubular extension. Since such tubular extension is sealed no air can gain access to the liquid within the extension and flowing slowly forward to the pump. Due to this closed form of the extension, its low level in the tractor, and to the fact of slow travel of the liquid forwardly along the extension, no cavitation can occur in the liquid, and the liquid delivered to the pump is substantially free of air. This ensures maximum pumping efficiency, especially for high pressure operations and avoids pump "starving" with consequent interruption to proper operation.

I have also provided good filtering units in the return lines from the various driven motors and other accessories, to trap any foreign matter which might otherwise be carried to the pump. It is important to make all provision reasonably possible to ensure against delivery of any foreign matter to the pump, especially when using high pressure pumping elements which must necessarily be constructed with very small clearance between moving parts. Such foreign matter as sludge, contained in the returning liquid will generally not be trapped by the filters. However, such elongated tubular extension of the tank, wherein the liquid is moving slowly, provides an excellent body wherein such sludge and other similar matter will settle, since the rate of liquid flow is less than the velocity needed to hold such material in suspension. A removable plug (see FIGURE 6) is provided in the bottom of such extension to facilitate cleaning out any such foreign material which may have collected in the extension during a considerable interval of operation. Such a plug is conveniently located near the front end of such extension.

In connection with the foregoing I also call attention to the fact that such forward frame extension is centrally located along the axis of the tractor, so that its structural features are best positioned for production of frame stiffness; and also such extension is located low down (being substantially level and having its rear end connected into the bottom front portion of the main tank). Thus, suitable floor plates may be provided at the sides of the lower face of such extension, to provide support for the feet of the tractor driver. Thus located and arranged, it is also convenient for the driver to sit in driving position with his feet straddling such extension and supported by the floor (or by the foot-pedal, presently to be described, for drive motor control).

I have provided a front frame element and pad connected to the front end of such extension, and serving as a carrier for the prime-mover-pump unit within the hood or housing.

Since the main tank is of size and form to provide great stiffness of itself, I avail myself of such tank and its location to provide the main rear portion of the frame of the tractor. In this connection the following further features are also here noted:

I provide beneath and attached to the bottom of such main tank, laterally extending flanges or plates, connected to such main tank floor, and drawing together at their outer ends in pairs, close to the locations of the corresponding tractor wheel bearings. Such outer flange end portions of such pairs of plates are then connected together by drive motor supporting plates which plates thus provide great stiffness between the main tank and the drive motor locations. The inner ends of such angling plates are securely fastened to the proximate surfaces of the tank, as by welding; it being noted, also, that such plates are of sufficient vertical dimension that they may be formed to engage both the bottom of the tank and its side walls (see FIGURE 3). The drive wheel bearings may also be supported by such plates; but conveniently I have provided drive motor units (presently to be described) which are of themselves provided with ample shaft bearings, so that further special bearings are not needed to provide ample bearing supports for the tractor wheels. Thus such plates directly support the drive motors (liquid driven as will presently appear), affording great stiffness and rigidity for the support of such drive motors.

It is also here noted that the drive liquid delivered by each drive motor is directly carried to the proximate main tank, through proper valve means, by short connections. Thus such heated liquid comes to the main tank very promptly.

The control valve for controlling the drive motors is conveniently located beneath the main tank, and close to both of such drive motors, so that both the high pressure liquid supply lines from the control valve to the drive motors, and the low pressure return lines from the drive motors to such valve are short and readily connected to the proper elements. Such drive motor control valve is conveniently operated by use of a foot pedal carried by one side face of the tubular extension liquid carrying element. Thus such pedal is convenient to the intended foot opertaions. Such control valve includes ports and passages for control of the delivery of pressure liquid to the motors and return of the low pressure liquid to the reservoir or tank for re-use; and for controlling such supply and return of the liquid for drive of the motors in either direction as selected.

It is here noted also that by mounting the drive motors to their supporting plates in the manner previously explained, their shafts and axes of motor rotation are coaxial with the respective drive wheels. Thus direct drives from the motors to the respective wheels are produced, without need of interposing gears or universal joints or belts, or the like, in the lines of drive. This arrangement also requires that each such drive motor shall be of size and type such that the needed torque may be developed for direct drive of its wheel. I shall hereinafter refer to this feature.

The front wheels for steering, are journalled to the ends of a transversely extending rock bar which is pivoted to rock on an axis extending lengthwise of the tractor and lying in a horizontal plane at higher elevation than the journals of the front wheels. Pintle units are then journalled to the ends of such rock bar on journal bearings which are canted inwardly towards the medial vertical plane of the tractor and are also canted backwardly at a slant of a few degrees from a vertical transverse cross section plane through the tractor at the location of such rock bar.

I have herein disclosed hitch units carried by the tractor and adapted to transmit traction to connected implements located either in front of the tractor, or behind it or beneath it, in some cases. I have disclosed one form of such hitch which will be described in this case; but it is noted that I have also disclosed pressure liquid operated means (such as a cylinder) by which such hitch unit may be manipulated to produce desired functions related to the operations of the implement thus hitch-connected. Such cylinder (and its plunger) thus provide power means for adjusting the operating condition of the connected implement, but other power connections are also provided, in the cases of certain implements, to produce the actual implement functions. Thus, in the case of a power driven mower connected to the hitch, such mower's blades are power driven by pressure liquid supplied by the prime-mover-pump unit, ancillary to the delivery of pressure liquid to the tractor wheels which are driven by their several pressure liquid motors. And, by means of the power operated hitch arrangement, and the form of the hitch itself, the power mower may be raised or lowered as desired to produce the intended height of cutting of the grass or other material. Or again, in the case of a snow-thrower implement properly connected to such hitch, the snow throwing blades may be power driven by pressure liquid derived from the prime-mover-pump unit, ancillary to the drive of the tractor itself by pressure liquid derived from such prime-mover-pump unit; and also in the case of such snow-thrower implement, provision may be made for shifting its hood into either of two positions for delivery of the snow to either side of the tractor unit, such shifts being produced by pressure liquid also as an ancillary operation with power supplied by the prime-mover-pump unit. Or again, in the case of a scraper or earth moving unit properly connected to the hitch, provision may be made for rocking such scraper in either direction of angle with respect to the travel of the tractor, to correspondingly deliver the moved material to either side of the tractor's path; such shifts also being produced by pressure liquid delivered by the prime-mover-pump ancillary to the delivery of pressure liquid to the drive wheel motors.

Such references to specific implements are made by way of example or illustration only, and are not intended as limitations to the usefulness of the tractor unit itself, all as will hereinafter appear.

The pressure liquid operated hitch controlling unit comprises a definite portion of the tractor proper and is attached to such tractor. Such implements as it may be desired to connect to the hitch, with pressure liquid operation of such implements or control thereof, require detachable attachment means for supply of the pressure liquid to such implements and for return of the low pressure liquid from such implements to the pump. Accordingly, I have provided conventional fixtures carried by the tractor and convenient of access to the user of such tractor, to which fixtures may be readily connected the liquid lines (generally hose) to and from the implement to be served, so that the necessary ancillary liquid-pressure-produced operations may be conducted. Such fixtures are conveniently secured to opposite sides of the tractor at locations close to the front thereof.

Suitable liquid control valves are provided for producing the needed control functions, both for the drive wheel motors and for such ancillary implements and for the proper controls of the hitch itself. Such valve elements are conveniently located on the "dash-board" close to the driver's position, for ready and convenient manipulation. I have hereinafter shown and shall describe suitable valve arrangements to produce the needed controls; and have also shown, schematically, and by diagram, several suitable systems of liquid delivery and control and return for re-circulation, which I have found to be well adapted to the needs of the various problems presented during the operations and controls previously referred to, as well as other operations and controls. At this point, however, I mention that it is desirable to use high pressures on the pressure sides of the systems, to enable transmission of the needed powers and for production of the needed torques with units of comparatively small size. Such pressures may be of the order of 750–3,000 p.s.i., so that comparatively small volumetric displacements of liquids may produce the needed power transfers. I shall hereinafter mention and in some cases shall illustrate and describe units and valves suitable for the present operations, but in so doing I wish it understood that I do not thereby intend to limit myself to such specific implements, except as I may do so in the claims to follow. The following comments are pertinent respecting the liquid flow circuitry in relation to various of the functions produced by the present equipment.

Conveniently I provide a direct driven high pressure positive displacement pump unit of comparatively small size but driven at rather high speed by direct drive from the prime-mover. Such drive may be at substantially uniform speed so that the pump displaces a substantially constant and uniform rate of volumetric flow. I then provide a regulator valve of construction such that a pre-determined high pressure such valve moves to a position permitting direct return flow of the supplied liquid, and of such construction that as pressure liquid is supplied to the circuitry for operation of the drive wheel motors, or other elements such as the ancillary units already referred to, with corresponding slight drop of supplied pressure, the returned volume or rate, delivered directly back to the pump, changes correspondingly to the rate of take-off demanded by such drive motors, or other equipment. Provision is also made in such valve for adjusting the pressure at which the return of liquid direct to the pump will occur. Thus, by such adjustment it is possible to maintain a substantially constant, pre-determined pressure available for operation of the connected elements. I also provide one or more valve elements of such construction that the pressure liquid may be delivered in either direction of flow through circuitry which supplies the ancillary elements, when such elements are to be used. Thus, for example, by uses of such valve it is possible to deliver pressure liquid through the connections which supply the snow-thrower, in either direction through the circuitry, for control of the direction of throw of the snow; or it is possible to control rock of the scraper element in either direction for delivery of the scraped material to either side of the path of travel of the tractor; or it is possible to deliver pressure liquid to the hitch control element for either raising or lowering such hitch element. All of these operations may be produced while driving the tractor at controlled speed, and with maintenance of desired pressure on the supply lines, within the capacity of the pump to deliver the needed volumetric rate.

It is also to be noted that such operations may be produced with a fluid flow circuitry in which the liquid delivered to the ancillary units comprises a circuitry parallel to that delivering to the drive wheel motors; or may be produced by a circuitry in which any demanded supply of liquid for the ancillary units may be series connected with the circuitry delivering to the drive wheel motors. In such latter embodiment it is evident that the total available pressure from the pump will be divided between the drive wheel motors and such ancillary units, in proportion to the torques which are demanded by such series connected units.

Further and more detailed disclosures of the circuitry provisions of the power liquid system will appear hereinafter.

Other objects and uses of the invention will appear from a detailed description of the same, which consists in the features or construction and combination of parts hereinafter described and claimed.

In the drawings:

FIGURE 1 shows a left side elevational view of a tractor embodying features of my present invention; such embodiment including one disclosed form of the hitch unit, but without showing any ancillary implement connected thereto;

FIGURE 2 shows a front elevation corresponding to FIGURE 1;

FIGURE 3 shows a rear elevation corresponding to FIGURES 1 and 2;

FIGURE 7 shows, schematically, three valve plug positions of a reversing control valve suitable for production of certain of the operations presently to be disclosed; such valve being of form to hydraulically lock the parts connected to and controlled by such valve when the plug is in its central or neutral position;

FIGURE 8 shows, schematically, the three valve plug positions of a modified form of the valve shown in FIGURE 7; such modification comprising provision for permitting free flow of the liquid through the valve plug between the supply and return ports of the valve, when such plug is in its central or neutral position;

Figure 4:
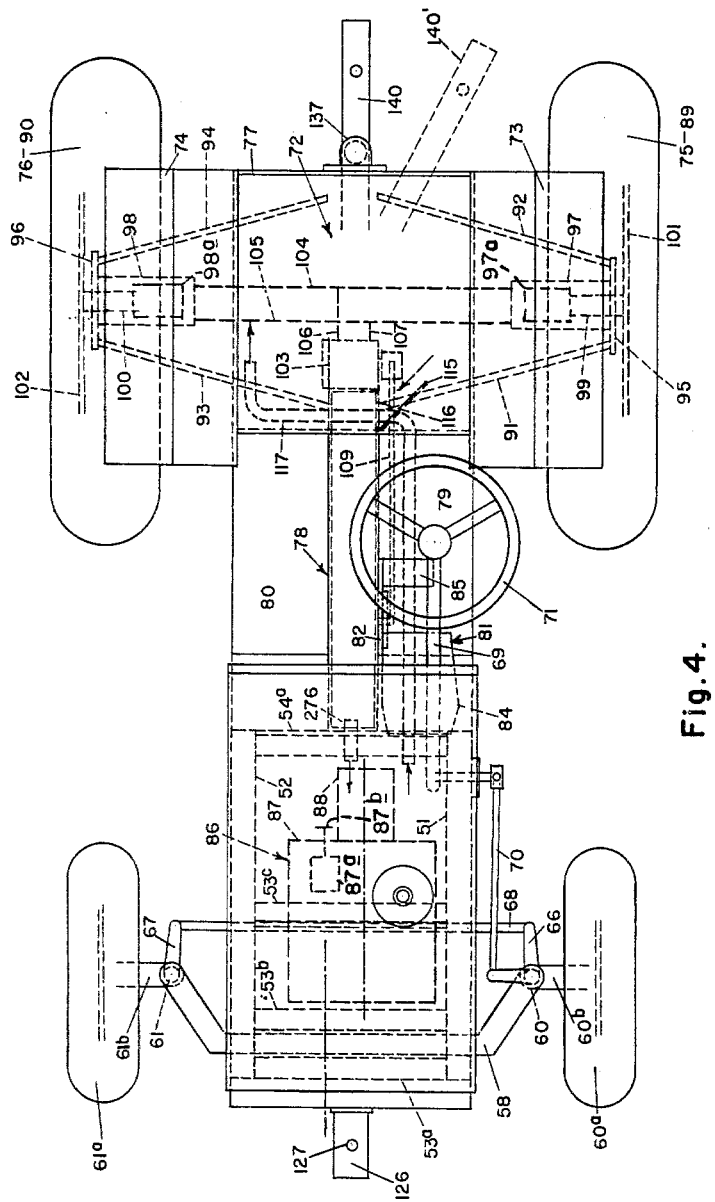
FIGURE 4 shows a plan view corresponding to FIGURES 1, 2 and 3, but on an enlarged scale as compared to such previous figures.

FIGURE 9 shows a longitudinal central section through a form of valve which is provided with a movable plug, together with a pressure liquid inlet connection, a first pressure liquid demand outlet connection, and a second pressure liquid outlet connection; together with means to adjust the operations of such valve manually for delivery of the pressure liquid to the first stated outlet connection at adjusted pressure in such volume as may be demanded within the capacity of the pumping means; excess pumped liquid from the pumping means being delivered through the second outlet connection; such last mentioned delivery comprising pumped liquid in excess of the rate demanded from the first demand connection and being delivered at the full pressure supplied to the valve;

FIGURE 10 shows a front end elevational view corresponding to FIGURE 9; and this figure shows the hand grip by which adjustments may be made of the delivered pressure through the first mentioned liquid demand connection;

FIGURES 11, 12 and 13 show cross-sections taken on the lines 11—11, 12—12 and 13—13, respectively, of FIGURE 9, looking in the directions of the arrows;

FIGURE 14 shows a longitudinal central section through a form of reversing valve by which supplied pressure liquid may be delivered to either end of a pressure liquid operated unit, with return of liquid from the opposite end of such unit; the valve unit shown in this figure being manually operated to either of its positions corresponding to the intended direction of movement of the controlled unit; and the valve shown in this figure is provided with a central or neutral station at which position the supplied liquid is permitted to flow directly through the valve without being sent first to a unit or implement to be operated and corresponding return of such diverted liquid back to the valve for controlled return of the liquid to another point; and this valve is also provided with means to automatically allow the supplied pressure liquid to flow through the valve to a return connection when, for some reason, such supplied liquid is blocked and its flow prevented, with possibility of development of excessive pressures due to such blocked condition; such means being spring controlled with provision for adjustment of the spring urge to an amount corresponding to the desired release pressure;

FIGURES 15 and 16 are cross-sectional views taken on the lines 15—15 and 16—16 of FIGURE 14, looking in the directions of the arrows;

FIGURES 17, 18 and 19 are face views of the outside of the valve casing of the unit shown in FIGURES 14, 15 and 16, with the manual control handle shown in its central or neutral position (FIGURE 17), in its forward supply position (FIGURE 18) and in its rearward supply position (FIGURE 19), respectively; the terms "forward" and "rearward" as thus used being comparative only, since of course they refer to two opposite directions of liquid flow through the valve unit;

FIGURE 20 shows, schematically, and by block diagram one embodiment of circuitry for controls of the liquid operated units already referred to herein;

FIGURE 21 shows another or second embodiment of circuitry which may be used;

FIGURE 22 shows a third embodiment of circuitry which may be used;

FIGURE 23 shows a fourth enbodiment of circuitry which may be used;

FIGURE 24 shows a fragmentary front elevational view of an alternative form of tractor embodying features of my present invention, such alternative form including hydraulic drives for all four of the tractor wheels, including the steering wheels; and this figure shows one form of mounting such steering wheels to the front axle and pintles, with their hydraulic motors in direct driving relation to such front wheels;

FIGURE 25 shows a fragmentary side elevational view corresponding to FIGURE 24; and FIGURE 26 shows a control layout for the four wheel drive arrangement of FIGURES 24 and 25, including a simple form of control valve for enabling drive and control connections to the drive motors for the front and rear wheels in selected driving relationship to each other.

Figure 5:
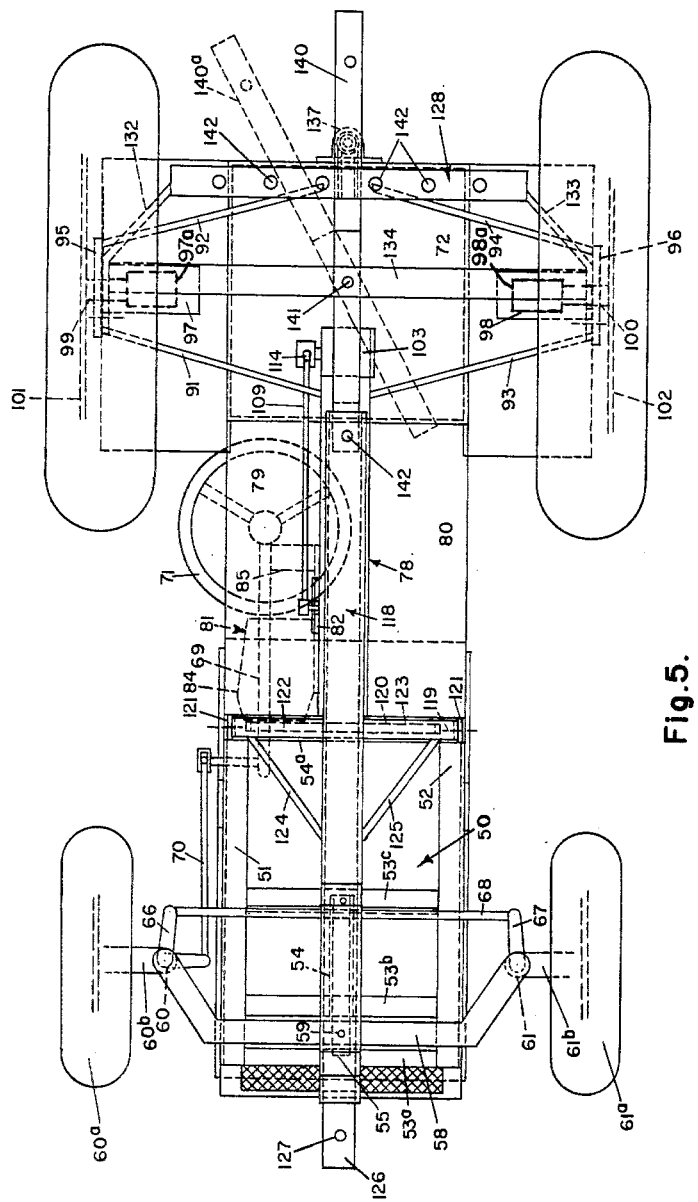
FIGURE 5 shows a bottom view corresponding to FIGURES 1, 2, 3 and 4; being a view looking up towards the bottom of the tractor.
Figure 6:
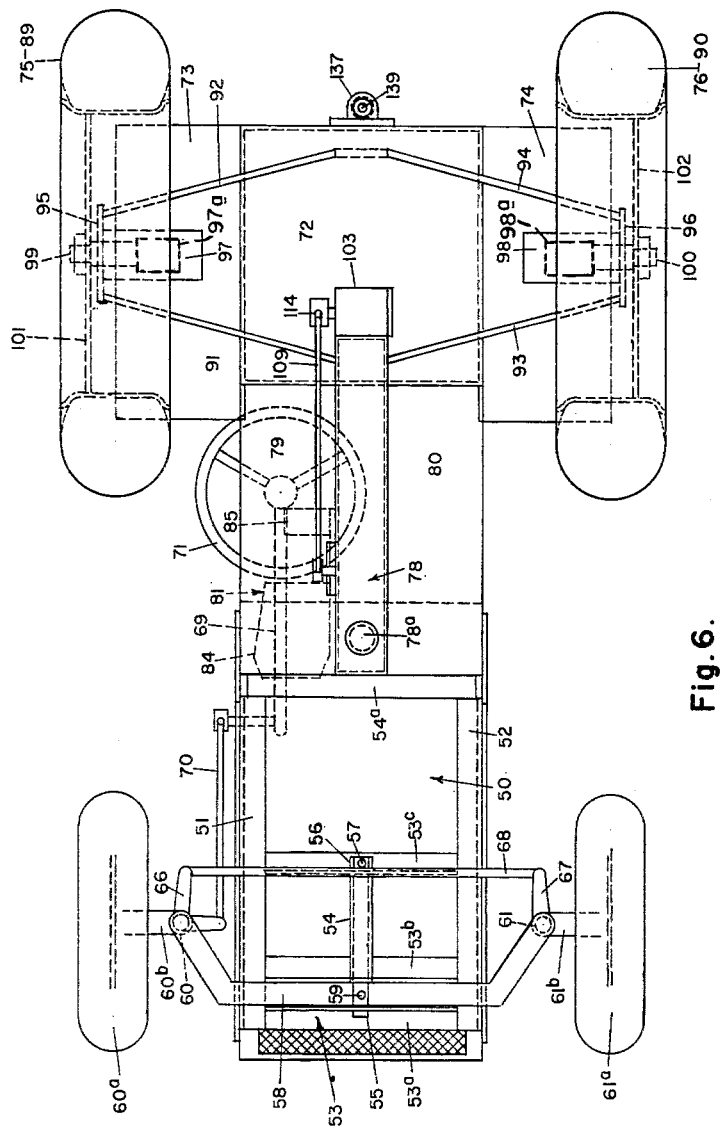
FIGURE 6 shows a view similar to that of FIGURE 5, but with the hitch unit removed to better reveal the frame structure of the tractor.

Referring first to FIGURES 1 to 6 inclusive, the tractor unit therein illustrated includes the frame element comprising the front rectangular section 50 formed of the side sills 51 and 52 joined together by the front and back cross members 53 and 54ᵃ by welding or otherwise. Conveniently such front cross member is formed of the three rather deep angle sections 53ᵃ, 53ᵇ and 53ᶜ spaced apart and carrying bearing elements for a short tubular support 54 (see FIGURE 6) through which the shaft rod 55 extends. Such rod carries the sleeve 56 at its rear end tied to the rod shaft by the pin 57 for limitation of the forward shift of the rod in the tube. To the front end of such rod there is connected the cross-wise extending axle 58 by the pin 59, so that such axle element may rock about a longitudinally extending axis, the rod 55 rocking in the tubular element or bearing during such axle rock. The outer or end portion of such axle are deflected rearwardly as shown in FIGURES 4, 5 and 6, and their outer extremities are provided with the pintle bearings 60 and 61 (see FIGURE 2) which receive the wheel bearing supporting elements 62 and 63 which may thus rock for the steering functions. These elements 62 and 63 terminate in the wheel bearing studs 60ᵇ and 61ᵇ which extend outwardly in directions which are horizontal or are slightly down turned to provide for "toe out" of the wheels 60ᵃ and 61ᵃ.

The journalling of the front wheels is well shown in FIGURES 1 and 2, and is legended as 60 and 61. Such pintles then extend downward far enough, as shown at 62 and 63, to meet the elevations of the front wheel bearings 60ᵃ and 61ᵃ. The front wheel studs 60ᵇ and 61ᵇ then extend outwardly and the wheels are journalled on their outer ends. As a result of such structure two benefits are produces as follows:

The pintle bearings 60 and 61 are much closer together than the corresponding wheel supporting studs 60ᵇ and 61ᵇ, so that the upper portions of the pintles lie considerably closer to the medial longitudinal plane of the tractor than the inwardly facing surfaces of the front wheel tires. In other words, the front wheel tires now have a greatly enlarged clearance from such pintle bearings 60 and 61 than would be the case if the pintles extended straight down from such bearings, instead of being flared outwardly as shown. Accordingly, mud and other sticky, gummy material (such as gumbo) which sticks to the front tires, and often extends inwardly from them for a substanital distance, will not come inwardly far enough to wipe against such pintle bearings. Thus jamming and blocking of the front wheels is avoided to a considerable degree by provisions of this improved mounting. The above benefit flows from the downward and outward flare of the pintles 62 and 63, taken in conjunction with the form of the pintle bearings 60 and 61.

The second benefit previously referred to is as follows:

By canting such pintle bearings backwardly (as well shown in FIGURE 1) an amount of several degrees (shown in FIGURE 1 as 7 degrees, plus or minus), the following benefit is attained; when the front wheels are centered for straight ahead travel such wheels lie in substantially vertical planes, parallel to the medial vertical plane of the tractor (being, however, usually slightly "toed" as distinguished from conventional practice). Now, however, and due to such rearward tilt or cant of a few degrees, as the front wheel pintles 62 and 63 are turned for the steering function, each such pintle stud 60ᵇ or 61ᵇ is tilted slightly as follows; the stud at the outside wheel (of the curve on which the tractor is travelling) is tilted upwardly so as to cant such wheel in the manner shown by the dashed line 64 of FIGURE 2, and the stud at the inside wheel (of such curve of tractor travel) is tilted downwardly so as to cant such wheel in the manner shown by the dash lines 65 of FIGURE 2 (it being further noted that the assumption is made in such FIGURE 2 that the turn is towards the left in such figure). Accordingly, each front wheel now "digs in" to the ground or other surface to thus better resist the outward forces extending radially from the center of tractor turn.

The wheel bearing supporting studs or pintles 62 and 63 are provided with the conventional rearwardly extending elements 66 and 67, non-parallel to each other, and joined together by the conventional reach bar 68; and that stud or pintle at the steering side of the tractor (shown as the left-hand side, see FIGURE 4), being the the pintle 62, is provided with a connection to the steering post 69 of conventional form, through the medium of the link 70, etc. The steering post carries the conventional steering wheel 71. Examination of FIGURES 4, 5 and 6 shows that provision has been made for proper turning of both front wheels for the steering function by provision of the non-parallelism of the elements 66 and 67 according to conventional practice.

The tank 72, of generally rectangular form, is located in the rear portion of the tractor, and forms, together with various connected elements, a portion of the tractor frame. This tank, well defined by the dashed lines in FIGURES 1 and 3, conveniently has its side plates carried up beyond its top to produce sides for a driver's seat, being the top of the tank; and such seat sides may be carried out laterally of the tractor to provide the fenders 73 and 74 over at least portions of the rear wheels 75 and 76. If desired, the back plate of the tank may also be carried up somewhat above the top surface of the tank proper (being the seat), to provide the back 77 of such seat (see FIGURE 1).

The tubular element 78 extends forwardly from the lower front portion of the tank, centrally of the tractor, to the location of the front frame element, already described. The rear end of this tubular element is open into the lower portion of the tank, so that such tubular portion constitutes a forward extension of the tank, and affords substantial liquid carrying capacity in itself. The front end of such tubular extension is closed, but a liquid supply conduit connects thereinto, as will be presently explained. Preferably such tubular extension is of rectangular section to afford substantial stiffness, its vertical and cross dimensions being sufficient to ensure such stiffness, both against bending and against torsional twist as may be needed to lend the needed strength and stiffness to the tractor frame; it being noted that such tubular extension thus comprises a material portion of the tractor frame. The front end of such tubular extension is connected to the front frame bar 54 in convenient manner, as by welding.

Reference to FIGURE 1 shows that the rear end portion of such tubular extension comes beneath the floor of the tank 72 so that good drainage from the tank into such tubular extension is afforded at all times.

Conveniently, floor plates 79 and 80 are secured to the lower side portions of the tubular extension as well shown in FIGURE 4, such plates reaching between the front frame member 54 and the front wall of the tank 72. These plates are well secured to the tubular extension and to the frame member 54, and to the tank, as by welding, so that they add additional stiffness and strength to the frame of the tractor. Being connected to the lower portion of the tubular extension such plates come at an elevation convenient for rest support of the driver's feet. The foot pedal 81 (see FIGURES 1, 4, 5 and 6) is carried by a plate 82 which sets against the side face of the tubular extention, to which side face such plate 82 is pivoted to rock about a horizontal transversely extending axis, 83, as shown in FIGURE 1. Such foot pedal includes the rather broad front portion 84 (see FIGURES 4, 5 and 6) to receive the toe portion of the foot; and also includes a heel portion 85 projecting laterally but slightly separated from such toe portion, to thus ensure sure actuation of the pedal for rocking either counterclockwise (FIGURE 1) for control during forward drive of the tractor, or clockwise, for control during reverse drive of the tractor, as will presently appear. Normally such pedal stands in its central or non-rocked position, to which it is returned when not foot depressed, such central position being the non-power-drive position.

A suitable prime-mover-pump unit is provided, being conveniently supported by the front frame element 50 already referred to. Such unit is schematically shown in FIGURE 4 at 86, including the internal combustion engine 87 driving the high-pressure liquid pump 88 preferably by direct drive. I shall refer in more detail to such pump hereinafter. It is, however noted that such power and pumping unit preferably includes provision for ensuring substantially constant operational pumping speed, at such speed as is adjusted by the operator within the limits of power output available from the prime-mover, and translatable by the pump unit. Such speed control unit is shown at $87^a$ in FIGURE 4, and a manual adjustment control element $87^b$ for setting the engine speed to a selected value is provided in connection with such unit $87^a$ for convenient adjustment by the driver. By locating such elements in the front portion of the tractor desired weight is provided at such front portion to meet operational conditions imposed due to the exertion of traction through the hitch, to be hereinafter described; and the developed power needed for drive of the rear wheels is transmitted to such wheels by the high-pressure liquid under the controls herein disclosed.

The rear, drive wheels are shown at 89 and 90. They are of substantial diameter according to conventional practice. Such rear wheels are journalled with respect to the rear portion of the tractor frame, and are driven by high-pressure liquid drive as follows:

There are secured to the bottom of the tank 72 the pairs of angularly located plates 91 and 92 (right-hand side) and 93 and 94 (left-hand side), (see FIGURES 4, 5 and 6, it being noted that such FIGURES 5 and 6 are inverted views, looking up towards the bottom of the tractor). These plates are conveniently welded to such tank bottom; and they project laterally beyond the sides of the tank far enough to reach substantially to the medial planes of the drive wheels 89 and 90, respectively. However such plates do not directly engage the drive wheel hubs or other drive wheel elements, but the drive-motor plates 95 and 96 are secured to the ends of the respective pairs 91–92, and 93–94 by welding or otherwise. Accordingly, it is evident that the bottom portion of the tank, which of itself comprises a material portion of the tractor frame, is greatly reinforced and stiffened by such pairs of plates 91–92 and 93–94, and also, that due to the angling manner in which such pairs of reinforcing plates are located, they materially resist any torques and corresponding tendencies to twist of the frame elements of the tractor when in service and developing substantial tractions.

A high-pressure liquid drive motor is provided for each of the rear drive wheels, such motors being shown in outline at 97 and 98 and their rotors being shown by dotted lines at $97^a$ and $98^a$ in various figures. Each such motor is secured to the inwardly facing side of the proximate plate 95 or 96, as the case may be; and the drive shafts 99 and 100 of such motors being connected to the rotors and extending directly through suitable openings slightly larger than the shafts, in the plates 95 and 96 to locations close to the central disks 101 and 102 of the drive wheels. Suitable driving and weight supporting connections are provided between the shaft ends and such wheel disks, so that the bearings of the drive motors act also as bearings for the respective wheels. Thus too, the driving torques developed by the motors are transmitted directly from the rotors of the hydraulic motors to the wheel disks. Such connections between the motor shafts and the wheel disks are removable, according to conventional practice, to enable convenient attachment of the wheels to or detachment of the wheels from the respective motor shafts.

In connection with the foregoing attachability and detachability of the respective drive wheels, examination of FIGURE 2, 3, 4, 5 and 6 shows that the disk of each wheel is set closer to one side face of such wheel than to the other side face thereof. Accordingly, by removing the drive wheels from their respective drive motor shafts, and turning such wheels around, they may be re-connected to their respective drive motor shafts with the wheels either closer together or farther apart than previously, thus enabling change of the tracking width of the tractor. In the wheel showings of FIGURES 2, 3, 4, 5 and 6 the wheels are attached to the drive motors under conditions producing a minimum tracking width (see full lines of FIGURE 3). By turning the wheels around as previously explained, the tracking width may be increased by an amount equal to four times the offset distance of the wheel disk of a wheel, from the medial plane of such wheel.

Many wheel tires are provided with high traction treads of special design such as special ribbing. Such tires can produce maximum traction when such ribbing acts against the ground or snow surface with the ribbing facing backwardly. In place of turning around the two wheels equipped with such tires, such two wheels may be exchanged, right for left and left for right, without turning each wheel around, and the wheels may then be secured to the shafts 99 and 100 in such exchanged relation. Thus the desired change of lateral spacing between the two wheels (tracking width) may be produced, while at the same time retaining both of the tires in proper relation to the ground surface to enable obtaining full traction benefits from their specially ribbed treads.

I have previously shown that by rocking of the foot pedal under either toe or heel pressure it is possible to control the drive motors for either forward or reverse drive. The following further statements are now pertinent.

I have mounted a drive motor control valve 103 to the underside of the frame and between the two drive motors 97 and 98 as shown in FIGURES 1, 4, 5 and 6. This control valve will be referred to again hereinafter; but at this point I mention that it is provided with a rock shaft drivingly connected to a rockable valve plug mounted in the valve casing. Suitable ports are provided in such valve casing, and suitable valving passages are provided in the plug, so that when such rockable plug stands in its central position, drive liquid is neither delivered to or received from either of the motors. They are then hydraulically locked against rotation in either direction. Then, by rocking the plug in one direction pressure liquid is delivered to both of the drive motors for drive in one and the same direction; but by rocking the plug in the opposite direction pressure liquid is delivered to both of the drive motors for drive in the opposite direction; and in either such operation the liquid coming from each drive motor is received back at the valve, and delivered to a common return line, for further disposition elsewhere. Thus, in FIGURE 4 I have shown the lines 104 and 105 connected to both of the drive motors, and connected by the lines 106 and 107 respectively, to the valve unit 103. When the valve plug is rocked in one direction the pressure liquid is delivered over the connection 106 to the common line 104, and the return liquid from both motors is delivered over the common line 105 through the connection 107 to the valve for delivery to a further unit, generally, the tank 72. By rocking the valve plug in reverse direction the connections to the lines 104 and 105 are reversed so that the line 105 now becomes the pressure line, and the line 104 now becomes the return line. Furthermore, the rate of permitted flow of the liquid is controlled by the degree of rock of the valve plug for control of the speed of wheel drive. The connections between the foot pedal and the valve plug of such valve 103 are shown in FIGURES 1, 4, 5 and 6, as follows:

The foot pedal 81 is connected to a downwardly extending finger 108 (see FIGURE 1); a rod 109 extends through such finger and may be adjustably connected to the finger by the opposite nuts so that the extent of projection of the rod through the finger may be adjusted with corresponding adjustment of the position of the pedal for a stated position of the rod. Such rod also extends through a stationary lug 110 extending down from the bottom plate 79; and an adjustable nut is threaded onto the rod behind such lug, such nut being shown at 111. The springs 112 and 113 are set onto the rod between the lug 110 and the pedal finger 108, and between the lug and the nut 111, respectively, so that such springs oppose each other. Thus the finger 108 and the pedal will be restored to a central position when the pedal is released, such that the urges of both springs balance each other. That is to be the position of the rod 109 which produces movement of the valve rock plug to its central or neutral position, it being noted that such rod is connected to the finger 114 of such valve rock plug (see FIGURE 1). By adjustment of the nuts which embrace the finger 108, and the nut 111, the parts may be brought to an adjustment such that when the valve is in its central position the foot-pedal is at a position convenient to the operator for his off-drive foot position.

At this point I mention that I have herein illustrated two forms of valve which are usable in connection with the foregoing operations, and I shall hereinafter describe them in detail. These are shown in FIGURE 7 (one form) and in FIGURE 8 (another form). However, the valve as thus illustrated in FIGURE 7 is of such characteristics that when in its central or neutral positions the lines 104 and 105 are hydraulically locked so that the drive motors are also hydraulically locked. Accordingly, with such forms of valve it is desirable to allow the foot pedal to move rather slowly to its central or released position when stopping the tractor after a driving operation, in order to avoid jerk such as would occur if the pedal were to be suddenly released and set back to its central position. However, it is here noted that the use of such central hydraulically locked position valve is in many cases desirable, since under the operational conditions just explained, the tractor is then locked against unintentional movement either forward or backward, thus preventing its roll down hill in either a forward tractor condition, or a backward tractor condition, according to which way the tractor may be faced on such hill.

Since the springs 112 and 113 act to centralize the position of the valve 103 when the foot pedal is released, it is seen that when the driver is absent from the tractor the valve is brought automatically to its central position, thus hydraulically locking the wheel motors and preventing either forward or backward rolling of the tractor until the foot pedal is again purposefully shifted to produce tractor movement. This, too, can occur only when the prime-mover-pump is in operation.

The power delivering liquid from all of the various operations, presently to be explained, is returned to the tank 72 from which it is again later drawn to the pump for re-use. In order to ensure that such liquid shall remain in the circulating system for as long an interval of time as possible, before its re-use I have made provision for ensuring that any released liquid from any one of the operations shall enter such tank under conditions such that any increment of liquid thus returned to that tank shall not again move to the pump until substantially all of the liquid in the tank and directly connected elements, has moved to and through the pump. Thus all portions of the body of liquid provided in the system shall be afforded a cooling interval substantially as great as required for movement of the entire body of liquid through the system, at the rate of flow then occurring. In other words, provision has been made to avoid any "short-circuiting" of the freshly used and released liquid and to ensure that such liquid shall in all cases have the benefit of the time for cooling equal to the total volume of liquid in the system divided by the maximum rate of pumping needed for any intended operation or combination of operations of the tractor and its various attachments or implements which use liquid power drive or operation.

Reference to FIGURE 4 shows a baffle plate 115 at the front end of the opening 116 in the end portion of the tubular element 78. Thus the liquid entering the rear end of such tubular element passes such baffle. A conduit 117 is provided through which the liquid released from the various liquid driven units is returned to the tank. This conduit terminates, as shown, within the tank element at a point such that the emerging liquid is given a swirling movement around the tank, commencing distant from such entrance into the tubular element. Thus such returning liquid is prevented from reaching the entrance to such element 78 by a direct path or short-circuit, and is caused to mix intimately with the body of liquid within the tank, with corresponding dissipation of the heat of such returned liquid into the body of liquid within the tank. Thus, too, there is produced high assurance that all portions of the liquid will remain within the tank, for cooling purposes an interval of time substantially equal to the total volume of the liquid within the tank, divided by the rate of withdrawal for power transfer purposes.

The traction transferring hitch shown in the embodiment of FIGURES 1 to 6, inclusive, includes the forwardly extending bar 118 which underlies the front half of the tractor frame and terminates somewhat in advance of the front end of the tractor frame section 50. This bar 118 is pivotally connected to such tractor frame section at or near the rear end thereof, by the transversely extending axial pivot 119, best shown in FIGURE 5. To this end such pivot comprises a transversely extending bar substantially at the elevation of the tractor frame, being the bar 120 having its ends journalled in the brackets 121 which extend down from the frame 50. The two brace bars 122 and 123 extend upwardly on a slant from the hitch bar 118 to such bar 120, as shown in FIGURE 2, being connected to the hitch bar 118 and to such bar 120 by welding or otherwise. I have also provided the supplemental brace bars 124 and 125 extending from the hitch bar at a point further forward than such pivotal connection, upwardly and laterally to meet the bar 120 near the brackets 121, so that horizontal components of force developed in the hitch bar will be properly transferred to the pivotal connection to the tractor frame.

It is now seen that such hitch bar 118 may swing forwardly and backwardly about the pivotal axis 119; but due to the fact that such hitch bar lies below the plane which includes the pivotal axis, the front end portion of the hitch bar must rise during forward shift of such hitch bar, with corresponding lowering of the rear portion of the hitch bar during such forward swing. During execution of such movements, however, such hitch bar is effectively retained against lateral shift to one side of the tractor or the other side thereof.

Conveniently such hitch bar comprises a length of square or other rectangular tubular section, so that it has great stiffness. Such bar may also be carried down near its mid-point, and then again raised at its front end portion, to avoid interference with the front axle element 58 and related parts. Connection of implements to the front end of such hitch bar is readily made by use of a male element set into the front end of such hitch bar and pinned thereto by a removable pin through suitable vertically aligned holes in the parts, or otherwise. In the showing of FIGURES 1, 4 and 5, I have indicated the short bar 126 set into the front end portion of the hitch bar, and provided with the vertical pin receiving hole 127, by which attachment may be made to the implement.

Further exploring this hitch embodiment it is seen that forward traction delivered to the hitch bar and transmitted to the implement would produce a rocking torque urging downward movement of the front end of such hitch bar, and corresponding downward thrust force onto the attached implement. Conversely, a rearward pull developed by the tractor would produce upward forces at the stated points. I have provided means constituting a portion of the tractor itself for countering such so developed forces, and for even overpowering them to produce intended controls of the hitch independent of or contrary to such traction developed forces. Such supplemental means is as follows, reference being had to FIGURES 1, 3, 5 and 6.

To the lower portions of the motor supporting plates 95 and 96 there is pivotally connected a rockable frame which includes the crosswise extending, double and spaced apart or twin bar element 128, between whose bars 129 and 130 there is established a horizontally extending slotted opening 131 (see FIGURE 3). The pivoting just referred to is produced by the two forwardly and slightly upwardly slanting bars 132 and 133 connected to the ends of such twin bar element, and joined together at their front ends by the crosswise extending bar element 134, the ends of such bar element 134 being upturned as shown in FIGURES 1 and 2, and pivotally connected to the motor plates above referred to. Such pivotal connections are as shown at 135 in FIGURE 1. Accordingly, such twin bar element proper lies in a plane somewhat below the pivotal points 135.

A bracket 136 is secured to the central portion of the uppermost of the twin bars, and extends upwardly and rearwardly as well shown in FIGURE 1. Thus the upper end of such bracket is brought to a location slightly rearward of the back face of the tank 72 (see FIGURE 1). A double acting hydraulic cylinder unit 137 is secured to the back face of the tank, for vertical movements of its plunger 138, and such plunger's piston rod 139 extends down to and is pivotally connected to the upper portion of such bracket 136, by a loose connection, if necessary, to allow for slight angularity imposed by the slight rocking movements of the bracket as it moves up and down. The upper and lower ends of such cylinder are connected by suitable tubes or conduits to the hydraulic system for actuation by high pressure liquid as needed and as controlled by the driver. Such operations will be explained hereinafter.

A traction bar 140 has its rear end pivotally connected at 141 to the cross bar 134 previously referred to, and extends rearwardly between the twin bars 129 and 130, and through the slotted opening 131, so that such bar may swing through a substantial angle to either side of the medial plane through the tractor. One such swing position of such bar is shown by the dashed lines 140ª in FIGURE 5. Several sets of vertically aligned holes 142 are provided through the twin bars 129 and 130, so that pins may be set down through such pairs of holes as selected, to retain the traction bar in its intended position of angle to the line of draft. When such traction bar is free of the hitch element bar 118, previously described, traction developed in such bar 140 will tend to rock it upwardly about the pivotal axis 135. Such tendency may be resisted by application of hydraulic force through the instrumentality of the cylinder and plunger unit. This is true whether such traction bar be aligned with the line of draft or not. It is evident that a trailing implement, such as a lawn mower connected to the bar when such bar has been set over to one side, will nevertheless be drawn straight ahead as the tractor progresses forwardly, so that such implement will function normally, but along a track or trace offset laterally from the path of the tractor itself.

By tilting both the hitch unit and the front end portion of the bar 140 downwardly, their proximate ends will separate slightly so that the front end of the bar 140 may be set into the rear portion of the hitch unit 118, it being understood that such unit 118 is tubular in section. Then a pin may be dropped through aligned holes 142 of the two units (see FIGURE 5) to retain them in aligned engagement with each other. Under these conditions the following further relationships and functions are noted:

Thus connected together by a rather loose pin connection, hydraulic force developed in the cylinder 137 may raise the rear end of the bar 140, thus producing rock of the hitch unit 118 about its own transverse axis, with depression of the rear portion of such unit 118, and raising of its front portion 126 to which an implement may be connected. The extent of such movement may be controlled by proper control of the hydraulically produced movement. Also, by producing hydraulic lock with the parts in their thus adjusted condition, such parts will be retained in such relation as long as the hydraulic lock is continued. Conversely, proper introduction of the high pressure liquid into the opposite end of the cylinder, with corresponding release of such liquid from the first used end of the cylinder, will produce reverse movements of the end portions of the hitch 118. It is thus evident that I have made provision for the power raising or lowering of an implement connected to either the front end of the hitch, or the rear end thereof.

Any suitable form of prime-mover-pump unit may be used for delivery of the high-pressure liquid to the driven motors or other elements. However, I have found that a convenient and highly satisfactory embodiment of such unit includes a Wisconsin Motor Corporation air cooled engine of sufficient horse-power to meet the power demands for hydraulically transmitted power (e.g., 4.7 h.p., to 9.2 h.p.), shown in bulletin of Wisconsin Motor Corporation, of Milwaukee 46, Wisconsin, bulletin Form S–217, titled "Model AENL, single cylinder heavy-duty air-cooled engine," as a prime-mover; and that such a convenient and highly satisfactory embodiment of such unit includes a pumping unit produced by Char-Lynn Company, of 2843 26th Avenue South, Minneapolis 6, Minn., designated as "Hydraulic Orbit," and including the gerotor orbit principle of operation, shown in Orbit Motor Catalog No. 2361 of such company, and carrying the notice of Patent No. 2,821,171. Such a pumping unit is a direct driven positive displacement rotary pump unit capable of delivering oil or other liquid under high pressures, and in volumes per minute according to the rate of pump drive, and its specific displacement volume. I have not herein illustrated nor specifically described either such a prime-mover or such a pumping element per se, since both such units are well known in the arts, and are shown in such printed publications. I wish it understood, also, that in referring to such specific units as suitable for performing the needed operations for which they are intended, I do not intend to limit myself, except as I may do so in the claims to follow.

Evidently there may be attached to the hitch bar such kinds, forms, and sizes of implements as may be desired, and as may be within the power requirements which can be met by the tractor unit itself. Frequently the intended operations of such implements require the supply of power to them, and various arrangements have hereto been devised to meet such requirements. Usually such power transmission arrangements for operation of such so-connected implements, have included or comprised mechanical drives, such as shaft drives with needed universal joint connections, or belt drive with needed guide pulley or wheel arrangements to transfer the power in different directions. Various of the novel features of my presently disclosed tractor per se are such that implements requiring such forms of power transmission as just referred to may be used with my tractor, making suitable provision for such mechanical transfers of power to such implements. However, I have herein disclosed several embodiments of valving and pipe circuitry for operation of such implements by hydraulic power delivered from the hydraulic power system of the present tractor. These power supply arrangements will be fully disclosed hereinafter.

I have previously referred to the engine which drives the positive displacement pump, as being operated at substantially constant speed. Provision is made for governing the speed of such unit to retain it substantially constant within the limits of power output available from the prime mover. With a positive displacement pump it is evident that the torque needed for its operation rises in direct proportion to the pressure at which such liquid is delivered. Accordingly, for a given rate of the liquid delivery in g.p.m., the power input of the prime mover to the pump must also be in direct proportion to the delivered pressure. Further, if for a given rate of the liquid delivery in g.p.m., the pressure be changed, the needed power input will also be changed in direct proportion to such change of pressure. If both the pressure and the rate be raised during an operation, the needed power input will also rise according to the product of the increment in rate (dg. p.m.) multiplied into the increment in delivered pressure (dp. s.i.).

Many prime movers of the internal combustion type show characteristic curves of torque vs. speed of such prime mover which curves rise with rotative speed to a peak value and then descend rather slowly at first, and at an accelerated rate thereafter as the speed is increased beyond such peak condition. However the needed power input from the prime mover to the pump is the product of the rate (g.p.m.) times delivered liquid pressure (p.s.i.), or torque.

The motors for the drive wheels are also of the positive displacement type, passing a specified volume of the liquid per revolution of the wheel (and motor). Also, the torque delivered by each wheel motor to its wheel is proportional (disregarding friction losses and also seepage of liquid past the motor rotor and the motor stator) to the pressure of the supplied liquid coming from the pumping unit. Accordingly it is desirable to make provision by which the pressure of the liquid supplied to the drive wheel motors may be regulated from time to time or continuously. The travel rate of the tractor driven by such high pressure liquid motors will depend on the rate of supply of the pressure liquid to such motors, and at the needed pressure. Such rate of supply to such wheel motors may be controlled by the valve 103 under control of the driver's foot-pedal 81; but provision should then be made to maintain the pressure of the liquid coming to such foot-pedal controlled valve substantially constant if the motor torque needed to drive the tractor is uniform (as when travelling at uniform speed on a level road, or on an incline of uniform gradient, or when pushing or pulling an implement of substantially constant drag). On the other hand provision should be made for increasing or decreasing the liquid pressure available to the wheel motors, in order to meet changed conditions of traction requirements. Such provision has been made in the presently to be described equipment.

I have made provision for governor or similar control to enable the rotative speed of the prime-mover-pump unit to be changed to any selected constant speed within the limits of speed adjustment for which the governor control is designed. Such constant speed, governor controlled devices, capable of adjustment to selected speeds, are well known in the arts, and need not be illustrated or described here in detail.

If for any set of operating condition the prime-mover-pump unit is regulated to a substantially constant rotative speed it is evident that it must deliver pressure liquid at a substantially constant rate (g.p.m.). Accordingly, I have also made provision for permitting pressure liquid in excess of the rate required to operate the wheel motors to be delivered over another line, automatically, and in amount to meet such excess liquid flow, while at the same time maintaining the pressure of the liquid delivered to the valve 103 substantially constant to meet the drive requirements imposed to satisfy the wheel drive motors. These functions are produced by a valve unit which also includes means to adjust the pressure at which the liquid will be supplied to the valve 103, and also the pressure supplied to such valve will then remain substantially constant at such adjusted value. The excess liquid will then be supplied to some other implement or unit at substantially the full pressure delivered by the pumping unit.

I have herein shown and shall describe a valve construction suitable for control of both the rate of pressure liquid flow to the wheel drive motors and the direction of flow through such motors for control of direction of tractor drive. This is the valve 103, which will also, for convenience sometimes be designated as B. I shall also show and describe the valve already referred to for regulating and dividing the pressure liquid flow to such valve B, such pressure regulating and dividing valve being designated for convenience as A.

I shall also show and describe another type of valve which may conveniently be used for controlling direction and rate of delivery of pressure liquid to the cylinder element 137 which controls the hitch embodiments already described. Such valve may also be provided with pressure regulating means to release liquid for return flow when the pressure supplied to such valve exceeds a value considered to be the maximum safe pressure for delivery to such cylinder or other supplied implement. This valve will, for convenience be designated as C.

The valve A is shown in FIGURES 9 to 13, inclusive. It includes the casing 219 having the central passage 220 which receives the endwise movable plunger element 221. This plunger element is normally set rightward by the spring 222 whose urge may be adjusted by turning the hand grip 223, presently to be described. The pressure liquid inlet port 224 which receives the pressure liquid from the prime-mover-pump unit, either directly or through other valve units, communicates with the port 225 entering at the right-hand end of such passage 220, and also communicates by the passage 226, with the port 227 at the lefthand end of such passage 226. The pressure liquid delivery port 228 communicates with such passage 220 rightward of the port 227, so that the pressure liquid delivered to the wheel drive motors or other unit, must move through the port 227 for such delivery.

The hand grip 223 connects to the stem 229 whose inner end comprises a valve element 230 seating against the port 227 to close the same, and such valve element 230 may be retracted leftward an adjusted amount by turning such hand grip and stem. The spring 222 seats at its left end against such valve element 230. Thus as such valve element is retracted leftward to open the port 227 for increase of pressure liquid flow, the urge of the spring is correspondingly reduced, so that leftward movement of the plunger element shall be affected by the urge of the spring. The endwise shift of the stem 229 and valve element 230 is produced by a rather steep thread between the stem and the sleeve 231 introduced between such stem and the left-hand end portion of the casing, such threading being shown at 232. The sleeve itself is threaded into the end portion of the casing as shown at 233. A pressure friction washer 234 is set into a radial hole of the outer end of the sleeve to seat against the stem 229; and such washer may be forced against the sleeve by an adjustment screw 235. Thus the frictional engagement of the washer against the stem is adjustable to resist rotation of the stem and corresponding shift of the valve 230 from the seat 227 under hydrostatic pressure (which would change the setting of the valve), but such frictional engagement is not sufficient to prevent desired manual adjustments to be made.

The right-hand portion of the plunger element 221 is of reduced size, to produce a rightwardly facing shouldered surface 236 which is in direct communication with the pressure liquid inlet port 224-225. A guide flange 237 at the right-hand end of the plunger is perforated at 238 so that pressure liquid acts at both faces of such guide flange. Thus the net force urging leftward movement of the plunger is equal to the area of such plunger, being the section of the passage 220.

When the valve 230 is shifted leftward to produce an opening through the port 227, the pressure of the supplied liquid is exerted against the left-hand end of the plunger on an area which is also equal to the area exposed to the full pressure at the right-hand end of the plunger. But such liquid pressure against the left-hand end of the plunger is less than the full liquid pressure from the supply connection 224 by an amount equal to the drop of pressure through the passage 226 plus the drop of pressure through the valve opening thus exposed. The urge of the spring acts in the same direction (rightwardly) as the liquid pressure against the left-hand end of the plunger. By designing the parts as needed, a net rightward differential force may act against the plunger to shift it completely to the right (as shown in FIGURE 9); but upon unseating the valve 230 for delivery of pressure fluid to the port 228 and the conduit connected thereto, the drops of pressure already mentioned will increase the differential sufficiently to allow the overpowering force against the right-hand end of the plunger to shift such plunger leftward against the adjusted force of the spring. Thus the urge of the spring acts to control the differential of liquid pressures against the right-hand and left-hand ends of the plunger 221.

The space between the right-hand face 236 of the plunger and the left-hand face of the flange 237 provides an annular groove 239 encircling the plunger. This groove is of length sufficient to ensure communication of such groove with the port 225 for full movements of the plunger back and forth. Thus such groove is at all times in communication with liquid supply of the full pressure delivered from the connection 224. When the plunger stands at its rightward position such groove is moved far enough rightwardly to be non-engaged with the port 240 which port communicates with the conduit connection 241 to which a conduit may be connected to receive pressure liquid coming from the pump in excess of the demand being met by the opening of the valve 230. As the differential of pressures against the two ends of the plunger (including also the effect of the spring) changes from time to time due to varying rates of demand for liquid through the port 228 and the conduit connected to it at the connection 242, the plunger will shift slightly back and forth, thus varying the amount of communication of the groove 239 with the port 240, and accordingly, varying the positions of the parts in manner to always permit the excess rate of pressure liquid supply to feed through such port 240 and its connected conduit. Such excess liquid of high pressure may then be used for other purposes, such as for driving the implements already described.

Examination of FIGURE 9 also shows that leftward shift of the plunger element 221 far enough to begin communication of the annular groove 239 with the port 240 brings the left-hand edge of such plunger to the right-hand edge of the port 228. Accordingly, as the plunger moves still farther leftward due to further increase in the differential of pressures acting on such plunger, the plunger will commence closing of such port 228 at substantially the same rate as communication of the groove 239 with the port 240 increases. Thus the combined openings of both such ports 228 and 240 will remain substantially constant to provide a continued full combined area of both such ports to accommodate the continued full flow of the pressure liquid coming from the pump at uniform rate (the rotative speed of the prime-mover-pump remaining constant during the operation in question, the governor speed remaining unchanged).

It is, however noted that leftward movement of the plunger 221 may be limited by engagement of the rod extension 221$^b$ on the left-hand end of such plunger. against the face of the valve 230. The amount of leftward travel of the plunger 221 to effect such engagement will depend on the position of the valve element 230, being smallest when such valve element is in seated position (shown in FIGURE 9), and will be greatest when such valve element is in its fully leftward moved—fully opened—position. In the latter case (valve 230 fully opened) the extension rod 221$^b$ will engage the valve 230 to limit leftward movement of the plunger 221 before pressure liquid inlet port 225 has been fully closed, and before the groove 239 has moved leftward far enough to seal the exit port 240. Thus the pressure liquid coming from the prime-mover-pump unit may continue to flow out through the port 240 and connection 241, even when the plunger 221 is moved leftward its full permitted amount. Again, such engagement of the rod extension 221$^b$ with the closed valve 230 will occur after the port 228 has been closed by overriding such port by the left-hand end of the plunger 221. When that happens the valve 230 can be forced slightly leftward by the differential of pressure now existing on the two ends of the plunger and against the urge of the spring 22. This can occur when such differential becomes large enough to cause the valve 230 and its stem 229 to shift leftward with slight rotation of such stem against the frictional resistance of the element 234, it being noted that the threading of the stem to the sleeve is rather large pitch. By proper adjustment of that frictional resistance the valve 230 may be thus set leftward enough to "crack" the valve opening 227, allowing full high pressure to be exerted against the leftward end of the plunger. Then the plunger can move slightly back and forth to test the pressure at the port 228, so that if a new demand for pressure liquid occurs in the conduit connected to the port 228 and conduit 242, such demand may be satisfied.

Valves capable of producing the operations and functions above described respecting the valve A are conventionally known and used for various purposes. An example of such a valve is that produced by Fluid Power Accessories, Inc., of Glenview, Illinois, Model No. 13-2-6.

The valve B or 103 which directly controls flow of the pressure liquid received from the regulating valve A is shown schematically in FIGURE 7 in one form, and in FIGURE 8 in a modified form, schematically in each case. This valve includes the plug, rotatable in the casing 244 or 244$^a$ between a central off position, in either direction through substantially 45 degrees of rock, one direction of rock delivering pressure liquid to the wheel motors for rotation in one direction, and the other direction of rock delivering the pressure liquid to such wheel motors for rotation in the other direction, return liquid from the motors being received by the valve in each case and delivered by the valve to another unit.

In the embodiment of FIGURE 7 the supply conduit for pressure liquid connects to the port 243, the return liquid from the motors is delivered from the port 244 to the return conduit; and the two conduits from the valve casing to each motor connect to the two opposite ports 245 and 246. The plug includes the two parallel through passages 248 and 249. In FIGURE 7 the schematic showing I shows the plug in its central position with hydraulic lock of both of the ports 243 and 244 so that liquid is shut off from the pressure supply conduit, the return conduit is closed, and both of the conduits leading from the valve ports 245 and 246 are sealed. Accordingly, with the valve in this position the motors are hydraulically locked against rotation in either direction. Rock of the plug in one direction from the position I to its positon II delivers pressure liquid to one of the ports whose conduit connects to the motors, and receives return liquid from the motors into the other port whose conduit connects to such motors, for rotation in one direction; whereas rock of the plug in the opposite direction from the position I to the position III causes delivery of liquid to the motor port from which liquid was previously returned, and permits return of liquid from the motor port to which pressure liquid was previously supplied. Thus rotation of the motor is reversed.

The extent of plug rock controls the extent of opening of the several valve ports, and thus controls the rate of flow of the liquid to and from the motor for control of speed of motor drive.

The modified embodiment of such plug valve shown in FIGURE 8 differs only from its predecessor by the inclusion of a through passage 247, centrally of such modified valve embodiment. When such embodiment of FIGURE 8 is set to its central plug position to seal against liquid flow of either pressure liquid to the motor or return flow of liquid from such motor to the valve, such central plug passage permits liquid flow directly from the pressure supply port 243$^a$ to the port marked R, thus adapting the valve to performance of functions other than have been outlined previously herein. One such other function is that shown in the schematic control flow layout hereinafter shown and described in FIGURE 20, titled as "Case A." Other functions for such embodiment of valve, B' will also suggest themselves to the reader hereof.

Plug valves such as that shown in FIGURES 7 and 8 are well known in the arts, one such embodiment being that known as the "Republic" "Lo-Torque" valve under the mark "RM."

Next the valve C is shown in FIGURES 14 to 19, inclusive; FIGURES 17, 18 and 19 showing three positions of the manual control handle, and the manner of liquid flow through the valve in each case. This valve is as follows:

The casing 250 is provided with a longitudinally extending or through passage 251 within which the plunger element 252 may be shifted back and forth by manual or other control. This plunger element extends through the left-hand end of the casing, a suitable packing 253 being provided to prevent seepage of high pressure liquid at such location. Oppositely disposed pressure supply and return liquid conduit connections 254 and 255 are provided in the casing, being on a common plane through the casing; and conduit connections 256 and 257 are provided in the casing, lying in a plane normal to the first mentioned plane, and extending axially of the casing. These connections are shown in FIGURES 17, 18 and 19, which are outside views of the valve unit; and the connections 256 and 257 are also shown by dashed circles in FIGURE 14, and in section in FIGURES 15 and 16. Such connections 256 and 257 connect by conduits to the two fluid connections of each of the motor elements to be controlled (such as the cylinder 137, or any implement). The plunger 252 is also provided with encircling grooves, and the casing is provided with passages such that when the plug stands in its central position (shown in FIGURE 17), pressure liquid entering through the port 254 is passed directly through the valve to the port 255 (or vice versa, in the case of reversed connections), without liquid flow connections to either of the ports 256 and 257, which ports are thus sealed against liquid entry or delivery; that when the plug stands in its most rightward position (shown in FIGURE 18), pressure liquid entering through the port 254 is delivered from the valve through its port 257 to the connected implement, and liquid returning from such implement is received through the port 256 and delivered from the valve through the port 255 for return to the pumping unit or other element; and that when the plug stands in its most leftward position (shown in FIGURE 19), pressure liquid entering through the port 254 is delivered from the valve through its port 256 to the connected implement, and liquid returning from such implement is received through the port 257 and delivered through the valve from the port 255 for return to the pumping unit or other location. It is here noted that FIGURE 14 shows the plunger moved to its most leftward position, corresponding to the handle position shown in FIGURE 19.

Shifts of the plunger 252 are produced by the handle 258 which is pivotally connected to the casing by the bracket 259 at the pivotal point 260. The directions of liquid flow just above stated are shown by the arrowheads in FIGURES 17, 18 and 19. Comparison of such showings reveals that without change of the pressure liquid input to the port 254, delivery of such pressure liquid for the connected implement is from the port 257 over its conduit to the implement, and back over the proper conduit to the valve port 256; for the condition shown in FIGURE 18; and that for the condition shown in FIGURE 19 the pressure liquid flow to the connected implement is through that conduit previously used for return liquid, and that the return liquid now comes to the valve over that conduit previously used for supply of pressure liquid to such implement. Thus the direction of liquid flow through the connected implement is reversed by shifting the plunger from its extreme rightward position to its extreme leftward position (FIGURE 18 to FIGURE 19).

It is also noted that the rate of flow of pressure liquid to the implement (and rate of return of released liquid from the implement to the valve) are controllable by control of the extend of plunger shift from its central position, and also that such plunger will stay in any such position of shift without need of locking it, since the valve is a "balanced" type of valve. This feature is important in view of the high liquid pressures used, especially for operation of the wheel drive motors.

Valves embodying the feaures of the unit shown in FIGURES 14 to 19, inclusive, are well known in the arts. One such unit is produced by Char-Lynn Company, of 2843 26th Avenue South, Minneapolis 6, Minnesota, under the identifying number V–960, or V–961, or V–962, shown in bulletin of that company, titled "Model V-960 Valve."

The statements contained in the preceding paragraph must, however, be subject to certain exceptional operating conditions under which the valve ceases to remain balanced, and may re-set itself from either of its extreme positions (shown in FIGURES 14, 18, and 19, respectively). If desired such re-setting would shift the plunger element and handle 252 and 258, to the central or neutral position, FIGURE 17, with interruption to the intended operational supply of pressure liquid. To prevent such un-intended re-setting to neutral the following expedient is shown (FIGURE 14):

Within the recess 261 of the plunger there is set a sheet metal insert 262 having its ends depressed towards the axis of the plunger to provide shoulders. Behind this insert there is also included in such recess 261 the leaf spring 263 whose ends bear against the ends of the insert to retain its projected outwardly and into engagement with the wall of the bore 251, as shown in FIGURE 14. Accordingly, when an obstruction is provided which may engage either of the end shoulders of the insert, the plunger will be retained against shift from its then occupied endwise or valve open position, towards its central or neutral position. Due to the spring pressure exerted by the leaf spring such condition may, however, be overcome to return the plunger towards its central, neutral position, when a sufficient force is developed by hand pressure against the handle 258. Such an obstruction is provided in the form of an endwise movable stem 264 having its end which engages the insert abutment of wedge or cam shape as shown in FIGURE 14, so that application of endwise force against the plunger will drive such stem outwardly against the urge of a light spring (not shown) and permit shift of the plunger to its central position. Such operation may be instituted from either of the fully endwise shifted positions of the plunger (FIGURES 18 and 19).

There is also provided in such valve C provision for permitting direct flow of pressure liquid from the inlet port 254 to the outlet port 255 under emergency conditions producing excessive pressure developed at such inlet port. To this end the following provisions have been made:

A partition 265 is interposed between the pressure liquid inlet port 254 and a chamber 266 of the casing 250. The port 267 is provided in such partition, and a ball valve 268 is seated against such port by the spring 269 whose urge may be adjusted by the threaded nut 270. Thus the pressure at which release will occur may be pre-set. Such chamber communicates by the port 271 (at the sides of the stem 264) between the chamber and the passage 272 which leads to the liquid return port 255, whenever the plunger has been set part way towards its central position, from either extreme of its movement. Thus, when excessive pressure acts through the inlet port with the plunger set to either of its extreme positions (FIGURES 18 and 19), the plunger will automatically shift to its central or neutral position for cut-off from the delivery port 256 or 257, as the case may be.

I have also shown, schematically, in FIGURE 26 another control valve D which may be used for control of the wheel motors for the case of a four wheel drive vehicle, or the like. This valve will be described hereinafter in connection with description of the flow sheet and circuitry illustrated in connection with such a four wheel, hydraulic drive arrangement.

In FIGURES 20, 21, 22, 23 and 26 I have shown, schematically, several forms of liquid flow delivery and control for vehicles, embodying various features of my present invention. These are now described as follows:

In the arrangement of FIGURE 20 ("Case A"), provision is made for controlled supply of the pressure liquid to a power-steering unit "P.S.," 273, to an implement, such as a lawn-mower, or a snow-thrower, or a scraper, "Imp.," 274, and to the hitch control cylinder, "Cyl.," 275, as well as to the wheel drive motors, "$M_1$" and "$M_2$," 276 and 277, generally, but not necessarily, the rear wheel drive motors. The liquid pressure pump is shown at 278, generally of the substantially constant but adjustable speed, and positive displacement, type, internal combustion or turbine prime-mover driven, as already referred to. The release liquid tank and its extension are shown at 72 and 78. In the arrangement of this figure, which includes the power-steering unit, it is very important to ensure the highest form of reliability for supply of the operational liquid to such power-steering unit, for purposes of safety and otherwise. Accordingly, the pressure liquid from the pump is delivered over the conduit 279 to the regulator and divider valve unit $A_1$, 280 (FIGURES 9 and 13). Thence the conduit 281 connects from the port 241 of such unit $A_1$ to the power-steering unit 273, so that full pressure liquid will be delivered to such power-steering unit as conforms to the description of such unit A previously included herein. In this connection it is remembered that the delivery of pressure liquid to the port 241 occurs when there is slight reduction of pressure at the left-hand face of the plunger 221 (FIGURES 9 to 13), and that increase in demand for liquid through the port 242 results in decreased opening of the liquid supply to the port 241. Thus, as demand for pressure liquid supply to the wheel motors increases, the port opening produced for supply of pressure liquid to the port 241 (for the power-steering) decreases. Thus there is assurance that such power-steering unit will have its demands fully met at maximum available pressure, even during times of demand for fast operation of the wheel motors. This is a feature of high importance since maximum assurance must be given that the needs of the power-steering unit will be met when called for. The return of liquid from the power-steering unit is effected over the conduit 282, through the filter 283, to the line 117 (see FIGURE 4) which delivers into the tank 72. The pump is supplied with liquid from the extension 78 over the conduit 284.

The port 242 of the unit $A_1$, 280, delivers over the conduit 285 to the inlet port 224 of the regulator and divider unit $A_2$, 286. The port 242 of such unit $A_2$, 286, delivers over the conduit 287 to another regulator and divider unit $A_3$, 288, and the port 242 of such unit $A_3$, 288, delivers over the conduit 289 to the inlet port of a reversing and control valve unit 290, marked B', $C_2$ in FIGURE 20. This unit may be either a unit such as C of FIGURES 14 to 19, or such as B' of FIGURES 8 (or 7). The showing in FIGURE 20 is of a unit C. It includes the input port 254, the direct output port 255, and the two ports 256 and 257, legended as shown in FIGURE 20. When in its central or neutral position (shown in FIGURE 20), the ports 254 and 255 are directly connected together; when shifted rightwardly the crossing passages connect the ports 254 and 257 together; and connect the ports 255 and 256 together, whereas when shifted leftwardly the parallel passages connect the ports 254 and 256 together, and connect the ports 255 and 257 together.

The wheel motors are connected together in parallel liquid flow by the conduits 291 and 292. These conduits connect to the ports 256 and 257, respectively, by the conduits 293 and 294. Accordingly, with the valve unit $C_2$ shifted leftwardly pressure liquid will be delivered to the two motors in parallel for rotation in one direction; and with the valve unit $C_2$ shifted rightwardly pressure liquid will be delivered to the two motors for rotation in the opposite direction. In each case the total liquid flow through the two motors will determine the rate of demand for pressure liquid from the port 242 of the unit $A_3$, and will be equal to the combined demands of both motors. Under the foregoing arrangement also, the port 255 connects by the conduit 295 to the conduit 296 (through the filter 297); and the conduit 296 delivers to the inlet 117 of the tank 72. Thus the full available liquid pressure is delivered to the wheel motors for their drive operation.

The port 241 of the unit $A_2$, 286, connects by the conduit 298 to the inlet port 299 of the unit $C'_1$, 300. This unit is a modified form of the unit C as follows: In addition to the central position, the leftward moved position, and the rightward moved position, shown in FIGURES 14 to 19, of the unit C, such unit $C'_1$ includes a second leftward moved position including the two ports 301 and 302, connected by the duct 303 so that when moved to this additional position the two ports 301 and 302 are directly connected together. This unit $C'_1$ controls supply of pressure liquid to the cylinder 137 (275) which controls the hitch element of the tractor. To this end the ports 304 and 305 connect by the conduits 306 and 307 to the ends of the cylinder 275, 137. Accordingly, the following hitch cylinder operations are provided for:

With the unit $C'_1$, 300 in the position shown in FIGURE 20 the two ends of the cylinder are hydraulically locked so that the plunger of that unit is rigidly held in its position at the time of such hydraulic locking. In this position, too, the ports 299 and 308 are connected together so that drainage liquid from the port 241 of the unit $A_2$, 286 may flow freely to the unit $C'_1$, 300, and thence from the port 308 over the conduit 309 to the conduit 296 and to the inlet 117 to the tank 72. If then the plunger 221 of the unit $A_2$ should be in any position other than its rightwardly moved position (see FIGURE 9), to seal its port 241 liquid would be spilled directly to the return line to the tank, flowing through the conduit 309 and the filter 310 therein. But it has been shown that the units A (FIGURES 9 to 13) are of such characteristics that their plungers automatically set themselves to positions to first supply the demands for liquid imposed through their ports 242. Accordingly, only such an amount of pressure liquid will be thus spilled to the tank return as is beyond the demand imposed by the unit $A_3$ (which delivers to the two wheel motors and to the unit $C_3$, presently to be considered); it being noted that the rate of liquid supply to such unit $A_2$ is the full delivery rate from the pump, reduced by such amount as, from time to time may be called for to operate the power-steering unit.

Next, if the unit $C'_1$, 300 be shifted to either its rightward position or its full leftward position, pressure liquid will be delivered, in each case, to one face of the plunger 138 (see FIGURE 1), and released from the opposite face of such plunger for drive of the same either up or down as may be desired for operation of the hitch. Any such small demand to satisfy the cylinder operations will usually be less than the spillage normally occurring through the conduit 309, and will thus not materially interfere with the drive operations of the wheel motors. It is to be noted, that such hitch cylinder operations will normally occur during tractor drive with corresponding wheel drive motor operations. A further operational condition incident to disposal of such "spill-over" liquid from the unit $A_2$, 286, will presently appear.

The port 241 of the unit $A_3$, 288, connects by the conduit 311 with the port 312 of the unit $C_3$, 313. The port 314 of such unit connects by the conduit 315 to the conduit 296; and such conduit includes the filter 316. Thus return liquid from such unit is delivered to the tank 72. In its central position such ports 312 and 314 are connected together for direct spill of arriving liquid, to the tank, such connection being by the lead 317. The leads 318 and 319 connect the implement 274 to such unit 313. In the central position of such unit $C_3$, 313, these conduits are blocked, to thus hydraulically lock the implement in its then position. Shift of the unit $C_3$ rightwardly operates the implement in one direction; shift leftwardly reverses such operation of such implement.

It is now noted that the liquid delivered over the conduit 311 from the unit $A_3$, 288, represents spillage from such unit $A_3$ beyond the rate of liquid demand imposed by the wheel drive motors, and is a portion of the liquid rate coming from the unit $A_2$ over the conduit 287, the rate through such conduit having been reduced by any spillage taken by the unit $C'_1$, already described. Thus the depletion of liquid rate remaining for wheel drive motor operation will be depleted by the instantaneous summation of demands imposed by the units $A_2$ and $A_3$. Such imposed demands will seldom be simultaneous but even when they may be simultaneous they will be small and thus not materially interfere with supply to the wheel drive motors of such rate of pressure liquid flow as may be required to meet the then speed of the tractor unit itself. It is, however, here noted that I have made provision for manually controlling the speed setting of the prime-mover which drives the pump P so that, if need be the driver of the tractor may adjust such prime-mover speed from time to time according to changing requirements for pressure liquid rate. I have, in FIGURE 3 shown at 262$^a$ a control button or element which is connected to the proper elements of the prime-mover controls for speed adjustment, such element 262$^a$ being within convenient reach of the driver of the tractor.

It is noted that when the unit $C'_1$, 300, is shifted rightwardly to register the ports 301 and 302 with the ports 304 and 305, the passage 303 provides a short-circuit connection between the conduits 306 and 307, so that liquid may be transferred freely back and forth between the two ends of the cylinder 275. Thus the plunger 138 is now allowed to move freely back and forth to accommodate changing hitch requirements, requiring up and down adjustments of the element 129–130 (see FIGURE 3).

Reference is next made to FIGURE 21 showing another set of controls, together with the control units and hydraulic connections between them, as follows:

In this case the control unit 290 (now B', $C_3$) and the two wheel drive motors $M_1$, 276, and $M_2$, 277 are connected together in the same manner as in FIGURE 20, but the manner of supply of pressure liquid to such unit 290 has been changed as follows:

The supply of pressure liquid to the implements, 274, and to the hitch cylinder 275, is now produced under control of the units $C_2$, 320, and $C_1$, 321, respectively, and such two units are connected together in series by the conduit 322, the conduit 279 delivering pressure liquid directly to such unit $C_1$, 321 from the pump P, 278. Accordingly, both of such units influence each other in their several operations. Thus, when the unit $C_1$, 321 is shifted in either direction to actuate the plunger 138 of the cylinder 275 for hitch adjustment, the amount of liquid which may then be delivered to the unit 320, $C_2$ for operation of a connected implement, is limited to that amount of liquid displaced during the comparatively small movement of the plunger 138. Accordingly, the operation of such so-connected implement will be stopped, to all practical intents and purposes during the hitch adjustment shifts. This may be desirable to prevent improper engagement of implement elements (such as the cutter blades of a lawn-mower) with objects which are proximate to such lawn-mower and might be improperly engaged by the hitch shift being made. The subsequent return of the unit $C_1$, 321, to its central position will restore fully continuous delivery of pressure liquid to the unit $C_2$, 320 for continuous operation of a controlled implement. It is noted, however, that a shift of the unit $C_2$, 320 into either of its three positions (its central position, illustrated, its rightward position, or its leftward position), will not prevent desired actuation of the hitch control by use of the unit $C_1$, 321, for shift of the plunger 138 either up or down as far as desired within the physical possibilities of such hitch unit.

The conduit 323 connects the port 305 of the unit $C_2$, 320, with the inlet port 224 of the regulating divider unit $A_1$, 288; and the conduit 324 connects the port 241 of such unit $A_1$, 288, to the tank 72, with inclusion of the filter F, 325 in such conduit. Accordingly, spillage from the unit $A_1$, 288 will be returned to the tank 72 as required from time to time. However, the port 242 of such unit $A_1$, 288 connects by the conduit 289 to the pressure inlet port 254 of the control unit B, $C_3$, 290, by which the direction of wheel drive and the speed thereof, are controlled (foot pedal control). The conduit 295 then connects the port 255 of such unit B, $C_3$, 290, with the conduit 324 in advance of such filter F, 325, so that spillage from such pedal control unit is returned to the tank 72 through the filter.

It is noted that with this arrangement of FIGURE 21, the return of the foot-pedal to its central position, for stoppage of wheel drive, does not interfere with the intended operations of either the hitch cylinder or the implement, since at such central foot-pedal position the unit B, $C_3$, 290 will pass pressure liquid directly through its body, such pressure liquid coming over the conduit 289 from the unit $A_1$, 288.

It is now noted that the arrangement shown in FIGURE 21 is one which may be broadly termed a "series" arrangement, since the pressure liquid delivered to the control unit which controls the wheel drive motors must come through both of the control units $C_1$, 321, and $C_2$, 320, and is, to some degree at least modified by the settings of such prior control units. A "parallel" supply arrangement may also be provided, in which the pressure liquid required for operation of the wheel drive motors comes directly from the pump, supplies of pressure liquid for ancillary operations, being also delivered directly from such pump by connections "parallel" to such wheel drive motor supply. Such a parallel arrangement is now described as follows:

In FIGURE 22 the wheel drive motors $M_1$ and $M_2$ are controlled by the foot-pedal control unit $B_3$, 290, under pressure liquid supply from the unit $A_1$, 288, by conduits and connections the same as shown in FIGURE 21; but in the present case pressure liquid for the unit $A_1$, 288, comes by the conduit 326 directly from the pump P, 278, to the inlet port 224 of such unit $A_1$, 288. Thus no interference with wheel drive motor operations is imposed by simultaneous operation of other facilities. Such other facilities as shown include the hitch control cylinder 275, 137, and the implement 274. These are controlled by the units $B_1$, 327, and $B_2$, 328, respectively. The conduits 333 and 334 supply pressure liquid to the inlet ports 329 and 330 of such control units, respectively, directly from the pump (or from the conduit 326, as shown); and the return conduits 335 and 336 connect the release liquid ports 331 and 332 of such control units, the conduit 324, through the filters 337 and 338, respectively, thus returning such liquid to the tank 72.

Detailed description of the operations made possible by the arrangement of FIGURE 22 is deemed unnecessary; but it is noted that in case the demands for pressure liquid flow rate imposed by the ancillary units (taking pressure liquid directly from the pump), should become such as to lower the intended wheel drive motor operations, or in case the demand for pressure liquid supply to the wheel drive motors should become so great as to leave an insufficiency of flow to meet the demands of such ancillary units, in either such case the speed of the prime-mover-pump unit may be increased by proper readjustment of the control handle 262$^a$, FIGURE 3.

In FIGURE 23 I have shown what may be called a "hybrid" arrangement between the arrangements shown in FIGURES 21 and 22. In the present embodiment of FIGURE 23 the pressure liquid supply for the wheel drive motors comes directly from the prime-mover-pump unit over the conduit 326, as in the case of FIGURE 22, moving through the regulator, divider unit $A_1$, 288; but in the present case the spillage from such unit $A_1$, 288, moves by the conduit 341 to the control unit $C_2$, 342, connecting the port 241 of the unit $A_1$, 288, to the port 343 of the unit $C_2$, 342. The companion port 344 of such unit $C_2$, 342, connects by the lead 345 to the conduit 309 which leads to the tank 72.

Such unit $C_2$ includes the cross conduits 347 and 348 at its left-hand end, and the parallel conduits 349 and 350 at its right-hand end, according to the practice hereinbefore explained. The ports of the cylinder are shown at 351$^a$ and 352$^a$, and the ports of the implement are shown at 353 and 354. In the arrangement now being explained the unit $C_2$, 342 comprises what may be called a selector unit, to select power operation of either of two ancillary units, such as shown, being the hitch operating cylinder and the implement 274. Thus, movement of the plunger of such unit $C_2$, 342 rightwardly will activate the implement 274 (the direction of such activation being presently explained), and movement of the plunger of such unit $C_2$, 342, leftwardly will active the hitch cylinder (the direction of such activation being presently explained). For such direction control of each such unit I have provided the simple reversing valves I and II for the cylinder control and the implement control, respectively. Thus, the conduit 355 connects the port 351 of $C_2$, 342, to one input port of the valve I, and the opposite port of such valve I connects by the conduit 356 with the conduit 345 for return of liquid to the tank; and additional opposite ports of such valve I connect by the conduits 357 and 358 to the opposite ends of the cylinder 275, 137. Likewise, the conduit 359 connects the port 352 to the unit $C_2$, 342, to one input port of the valve II, and the opposite port of such valve II connects by the conduit 360 with the conduit 345 for return of liquid to the tank; and additional opposite ports of such valve II connect by the conduits 361 and 362 to opposite ports of the implement 274. The rotary plugs of such valves I and II are provided with parallel through passages or conduits so that by rocking such valves through ninety degrees the input ports and the delivery ports are connected to opposite conduits leading to the ancillary unit, for opposite supply of pressure liquid to such unit, and release of return liquid from such unit, as required. Conveniently the plugs of both such valves I and II are ganged together, as shown by the line 363.

Study of the foregoing arrangements of FIGURE 23 will also show that when either ancillary unit is nonoperative due to central positioning of the unit C₂, 342, such unit is liquid or hydraulically locked at one side, so that it cannot be moved and will remain in its then position. Thus, in the showing of FIGURE 23 both of the ancillary units are thus hydraulically locked, both of the conduits 355 and 359 which come to the ports 351 and 352 being blocked by the plunger of the unit C₂, 342. It is also noted that with this arrangement of FIGURE 23, when the plunger of the unit C₂, 342 is moved to either end for selection of that ancillary unit which shall be hydraulically operated, the other ancillary unit is then completed freed for permitting it to "float" without restraint hydraulically. Thus, when the plunger of the unit C₂, 342 is shifted leftwardly from its position shown in FIGURE 23 pressure liquid is delivered to the right-hand face of the plunger 138 to force such plunger leftwardly, its left-hand face being then in communication with the release conduit 345. This direction of urge against the plunger 138 is determined by the position of the reverser valve I, as shown. Correspondingly, the reverser valve II is now in its position as shown, due to the ganging of the two valves I and II. Then, the valve II being in its illustrated position, both of its terminals are connected together through the release conduit 345, so that such ancillary unit is now free to float without hydraulic restraint. A like analysis of the conditions when the two reverser valves have been reversed, or when the plunger of the unit C₂, 342 is reversed, will show a similar operational condition.

The showings heretofore described have been for an installation incorporating drive of the two wheels only, being shown as the rear wheels. Various of the inventive features herein disclosed are also applicable to four-wheel drive vehicles, notably four-wheel drive trucks. I have illustrated and shall now describe a schematic showing of the pressure liquid drive motors drivingly connected to the front wheels of the vehicle hereinbefore illustrated and described. For this purpose reference is made to FIGURES 24 and 25; and in FIGURE 26 I have shown schematically, a control valve arrangement whereby the wheel drive motors for the front and rear wheels may be hydraulically connected in either parallel liquid flow condition, or in series liquid flow condition, supply of the pressure liquid coming in each instance from a common prime-mover-pump unit as already described. I have also, in such showing, made provision whereby only one set of such drive motors (e.g., those for the rear wheels) may be supplied with pressure liquid, thus imposing the full available volume or rate of liquid flow on a single set of the motors for reasons presently to be explained, and at the same time making provision against hydraulic locking of the non-driving motors (the front wheel motors).

In FIGURES 24 and 25 I have shown the two front wheels 60ª and 61ª, the crosswise extending axle 58 journalled on the lengthwise extending shaft element 55, and the two pivotal mountings 60 and 61 for the wheel bearing supporting elements 62 and 63. For hydraulic motor drive of such front wheels I provide a motor plate on each of the elements 62 and 63, being the plates 364 and 365. The front wheel motors 366 and 367 are secured to these plates with their motor shafts projecting outwardly away from the motor plates and somewhat beyond the outer ends of the motors themselves. The wheel disks are then secured directly to such projecting motor shaft ends so that the motor bearings serve as bearings for supporting the front wheels directly. Such two hydraulic motors are preferably connected together in parallel connection so that each such motor may receive and transmit its required rate of pressure liquid flow in rounding curves and the like. Reference is now made to FIGURE 26 as showing a convenient arrangement of liquid supplies to the four motors of such a four wheel drive vehicle, including provisions for connecting the pairs of rear and front wheel motors together in various operation combinations, all as now described.

The rear wheel motors are shown at 370 and 371, and the front wheel motors at 372 and 373 in FIGURE 26. Such rear wheel motors are connected together by suitable conduits 374 and 375 in parallel, with both of them served by the liquid conduits 376 and 377; and the front wheel motors are connected together by suitable conduits 378 and 379 in parallel, with both of them served by the liquid conduits 380 and 381. The valve unit D, 382, serves all four such motors and is provided with suitable ports, conduits, and operational elements to enable connection of the set of two rear wheel motors in series with the set of two front wheel motors; or to enable connection of both such two sets of motors in parallel arrangement with each other; or to enable driving use of only one of such pairs (e.g., the rear wheel motors), with the other pair of motors cut out of driving service, but with conduit provisions such that the rotations of its wheels with corresponding rotations of its motors may occur without impairment by hydraulic locking of such motors. Provisions have also been made for reversing the motors of both pairs in harmony for reverse drive. To these ends the valve unit D, 382, includes the following elements:

Such unit includes the outer shell element 383 and the inner concentric tubular element 384, such two elements being joined together by the end plates 385 and 386 so that they retain fixed relation to each other. Between such two elements there is included the endwise slidable annular element 387 which may be shifted in either direction from its central position at which position it is shown in FIGURE 26. The inner tubular element 384 is provided with central bores or conduits 388 and 389 which reach inwardly towards each other, but are hydraulically separated from each other by the central partition 390. These conduits 388 and 389 are served by flexible hose or conduits 391 and 392 which serve to supply the pressure liquid to the valving elements, and to return such liquid from the valve unit; and the directions of liquid flow through such flexible conduits determine the direction of rotation of the several motors served. Thus, both such conduits are brought to the reversing valve unit B, 393, having the sets of opposing ports 394 and 395, and 396 and 397, respectively. As shown, the conduit 391 connects to the port 397, and the conduit 392 connects to the port 396. The pump P, 278, takes its liquid from the tank 72, 78, and delivers it over the conduit 398 to the intake port 224 of the regulator, divider unit A, 399; and the ports 242 and 241 of such unit deliver the pressure liquid according to the operations already disclosed in detail. The conduit 400 thus delivers pressure liquid to the port 394 of the reverser valve, and the conduit 401 delivers pressure liquid to ancillary units according to operations already described. The return conduit 402 connects the port 395 with the return conduit 117 entering the tank 72, as already explained elsewhere, such conduit including the filter F, 403.

At one side of the valve element 383, such element is provided with the adjoining ports 404 and 405; and such element 383 is also provided with the ports 406 and 407 opposite to such ports 404 and 405, respectively. Also, the tubular element 384 is provided with the through ports 408 and 409 in alignment with the ports 404 and 406, and the ports 405 and 407, respectively. Such through ports connect with the endwise extending passages or conduits 388 and 389, respectively. All such parts retain fixed relationship to each other.

The slidable element may be termed a selector element. It is provided with the centrally located, radially extending conduits 410 and 411 which are spaced apart a distance equal to the spacing between the ports 404 and 405, and thus also, to the spacing between the through conduits 408 and 409. Opposite to such conduits 410 and 411 such selector elements includes the ports 412 and 413 spaced apart a distance equal to the spacing between the ports 406 and 407. Such ports 412 and 413 are connected together by the axially extending conduit 414 so that all such parts may produce a function hereinafter to be explained. It is noted that such ports 412 and 413 and conduit 414 do not communicate with the through conduits 408 and 409 with which they are, however, aligned.

The selector element is also provided with the pairs of radially extending conduits 415 and 416 at one side of such selector, and 417 and 418 at the opposite side of the selector; and with the radially extending conduit 419 at one side of the selector and another radially extending conduit 420 at the other side of the selector, such conduits 419 and 420 being axially displaced from each other, and not in radial alignment. The selector element also includes the port 421 in radial alignment with such conduit 419 but non-connected thereto; and also includes the port 422 in radial alignment with such conduit 420 but non-connected thereto; and such ports 421 and 422 are connected together by the conduit 423 extending diagonally through the selector element, and curving around the conduit 389 thereof, such conduit 423 being thus isolated from the conduit 389. All such conduits 410, 411, 412, 413, and 415 to 420, inclusive, as well as the ports 421 and 422, are spaced axially along the selector element at equal spacings, equal to the spacings between the ports 404 and 405, and 406 and 407. Thus, by shifting the selector element endwise axially through the element 383 various combinations of connections of the said ports 404, 405, 406 and 407, with the through conduits 408 and 409 may be produced, as follows:

In the central position shown in FIGURE 26 the conduits 391 and 392 are connected to the conduits 376 and 377 which serve the rear wheels; and the ports 406 and 407 are connected together, thus also connecting together the conduits 380 and 381 which serve the front wheels. Accordingly, under this condition pressure liquid may be delivered to the rear wheel motors and return liquid from such motors may be withdrawn; and at the same time, the front wheels and their drive motors may freely rotate without hydraulic lock, since they will then acts as pumps circulating liquid through a short circuited system. Next, by shifting the selector unit leftwardly a distance to register the conduit 419 and the port 422 with the ports 404 and 405, respectively, and to register the port 421 and the conduit 420 with the ports 406 and 407, respectively, the conduit 388 will be connected with the port 404 and the conduit 389 will be connected with the port 407; and at the same time the port 422 will be registered with the port 405, and the conduit 419 will be registered with the port 404. It will be seen that under this set of connections the conduit 388 is connected to the port 404, and the conduit 389 is connected to the port 407, with the ports 422 and 405 connected together and the ports 421 and 406 connected together, thus connecting the ports 405 and 406 together through the conduit 423. Accordingly, the front and rear wheels are connected in series relation to each other as groups, with the motors of each such group (front and rear) in parallel connection with each other.

Next, by shifting the selector element rightwardly far enough to register the conduits 415 and 416 with the ports 404 and 405, respectively, and to register the conduits 417 and 418 with the ports 406 and 407, respectively, the rear wheel motors will be connected to the conduits 388 and 389, and the front wheel motors will also be connected to such conduits 388 and 389 in parallel relationship of the two groups of motors (rear and front wheel groups). Thus by shifting the selector element into either of three positions selection may be made of wheel drive by the rear wheels alone (with the front wheels non-hydraulically locked); or with the rear wheels in series connection with the front wheels; or with the rear wheels and the front wheels in parallel connection with each other.

It is now noted that, assuming that the speed of the prime-mover-pump unit remains unchanged, a constant rate of pressure liquid flow is maintained under each of such three combinations of the wheel motors. Therefore, with the rear and front wheel motors in parallel connection such full rate of liquid flow will be divided, one-half flowing through each set of the motors. This will necessarily produce a given rotational speed of such motors, with corresponding wheel speed. Next, by placing the rear wheel motors in series with the front wheel motors the full rate of liquid flow will be produced through each set of motors, thus doubling the rotational speed of all of the motors and wheels; and finally, by setting the selector element into its central position (as shown in FIGURE 26) the full volume of liquid flow will be delivered through only one set of the motors, leaving the other set in idling condition. This will accordingly also produce rotational speed at the same rate as that produced by the series connection, but with absorption of only one-half of the pressure required for the series connection operation. This would enable drive at the same rate as that produced by the series connected arrangement, but with need for delivery of only one-half of the torque at the prime-mover-pump unit, and with corresponding reduction of rate of fuel consumption.

The direction of rotation of the wheel motors will depend on the direction of liquid flow through the control unit D, 382. That is to say, for pressure liquid input through the conduits 391 and 388, and release liquid outflow through the conduits 389 and 392, the rotational direction will be, say, forward, and for reverse liquid flow through the system the rotational direction will be reversed. Accordingly, I have provided the reversing valve B, 393 between the pressure and return conduits 400 and 402 respectively, and the conduits 391 and 392 respectively, to enable reverse direction of motor drive in simple fashion.

The selector element 387 may be shifted back and forth in convenient manner. For this purpose I have shown the stem 424 connected to such selector element and projecting out through the end plate 385 far enough to allow for needed endwise movements of the parts, such stem being provided with the hand grip 425, and with the pointer 426 referring to the scale 427 on which are inscribed suitable position indicia as shown. Vent ports 430 and 431 are provided in the two end plates 385 and 386, respectively. These vent ports allow discharge of liquid from the end portions of the cylinder 382 in case of seepage of high pressure liquid between the cylinder 382 and the element 384, on the one hand, and the selector valve 387, into said end portions of the unit. This will prevent possible hydraulic locking of such selector valve by an accumulation of such seepage.

The hitch operating cylinder 137 and its plunger 138 comprise a permanent portion of the tractor (when such power cylinder is used for the hitch operations), whereas when various implements or ancillary units such as a lawn-mower or snow-thrower are to be hydraulically operated, necessary hydraulic connections must be temporarily made from the tractor itself to such ancillary units. Such hydraulic connections should be readily connected or disconnected from time to time. Furthermore, the hydraulic conduits between the tractor units and such ancillary units should be sufficiently flexible to allow for changes in direction or elevation, etc. Accordingly, I have provided at the opposite sides of the tractor, preferably close to the dash-board or other control panel, the fixtures 428 and 429 (see FIGURES 1, 2 and 3) which comprise plug in terminals of the liquid pressure conduit for supply to such ancillary unit, and of the liquid return conduit for return of the liquid from the ancillary unit to the tractor hydraulic system. These fixtures may be of any convenient form and structure to allow for ready and convenient attachment of the flexible hose terminals by simple plug-in or pull-out operations; and fixtures of this kind are well known in the arts, and I have therefore not illustrated them in detail herein. However, it is desirable that such fixtures be provided with self-sealing arrangements so that they will automatically seal against loss of the liquid when the flexible hose are disconnected from the fixtures, and so that the act of inserting the hose terminals into such fixtures will automatically open such seals to permit flow of the liquid through the connection, between the tractor and the ancillary unit in question.

In various of the flow figures (FIGURES 20, 21, 22, 23 and 26) I have shown such fixtures schematically by the X's numbered 428 and 429 to correspond with the physical showings of such fixtures in FIGURES 1, 2 and 3.

I claim:

1. A motor vehicle including in combination a frame, a pair of spaced apart motor plates lying in vertical planes parallel to and at opposite sides of the longitudinal medial plane of the vehicle, a positive displacement hydraulic motor corresponding to each motor plate, each hydraulic motor including stator and rotor elements and a drive shaft in driven connection with the rotor element, means to secure the stator element of each motor to the corresponding motor plate with the drive shaft of such motor normal to the motor plate, a vehicle drive wheel mounted on and secured to the drive shaft of each such motor, conduit means to supply pressure liquid to each hydraulic motor, and means in connection with such conduit means to control the flow of pressure liquid through said hydraulic motors, wherein the frame includes outwardly extending frame plates at opposite sides of the medial plane and reaching to the proximate motor plates, together with means to secure the outer ends of said frame plates to the corresponding motor plates, and wherein there is a pair of such frame plates at each side of the medial plane of the vehicle with the outer ends of the plates of each pair spaced apart from each other longitudinally of the vehicle, and wherein each hydraulic motor is located between the inner face of the corresponding motor plate and the medial plane of the vehicle and between the corresponding frame plates, and wherein the outer end of the stator of each motor is secured to the inner face of the corresponding motor plate, and wherein the driven shaft of each motor extends through and projects beyond the motor plate, and wherein each drive wheel is mounted on and secured to the projecting portion of the corresponding driven shaft.

2. A motor vehicle frame comprising in combination a cubical shaped liquid receiving tank, a forwardly extending tubular element having its rear end portion extending beneath the floor of the tank and in liquid transfer communication with the interior of the tank, means to secure such rear end portion securely to the tank floor, outwardly extending vertical frame plates beneath the floor of the tank and extending outwardly at both sides of the medial plane of the tank; means to rigidly secure the upper edge of such frame plates to the tank floor, motor plates secured to the outer ends of such frame plates, a positive displacement hydraulic motor secured to the motor plate at each side of the vehicle with the drive shaft of such motor extending normal to the medial plane of the vehicle, and projecting outwardly beyond the corresponding motor plate, and constituting a drive wheel supporting and driving element, a horizontal prime-mover-pump unit supporting platform secured to such tubular element and constituting the front portion of the vehicle frame, a liquid pumping, motor-driven unit mounted on the platform, pressure liquid delivery conduits extending from the pumping unit to both of the hydraulic motors, return liquid conduits extending from the motors to the liquid receiving tank, pump liquid supply conduits extending from the front end of the tubular element, to the pump liquid intake, and pressure liquid control valve means comprising a portion of the pressure liquid delivery conduits between the pumping unit and the hydraulic motors.

3. A motor vehicle as defined in claim 2, wherein the forwardly extending tubular element is substantially contained within the medial plane of the vehicle.

4. A motor vehicle as defined in claim 2, wherein said extension comprises a closed, air-tight enclosure below the level of liquid contained within the tank for de-aeration of liquid moving from the lower portion of the tank through such elongated extension to the conduit which is in communication with the pump.

5. A motor vehicle as defined in claim 4, together with a drain opening in the floor of the elongated extension at a point close to the end thereof, and plug means to seal said drain opening.

6. In a motor vehicle, a frame element including a liquid receiving tank, and including a forwardly extending tubular frame element having its rear end portion extending beneath the floor of the tank and in liquid transfer communication with the interior of the tank and having such rear end portion rigidly and securely connected to the lower portion of the tank, rear vehicle drive wheels at the sides of the tank, a positive displacement hydraulic motor corresponding to each drive wheel, motor supporting means between each such motor and the lower portion of the tank, the driven shaft of each such motor projecting outwardly from the medial plane of the vehicle and constituting a wheel supporting and driving element, release liquid conduits from both of the motors, liquid pumping means in proximity to the forward end of the tubular element, conduits between the front end of such tubular frame extension and said liquid pumping means for delivery of liquid from the tank, through the forward frame extension, to the pumping means, pressure liquid conduits from the pumping means to the motors, and connections between the release conduits from the motors to the interior of the tank, including terminal portions of such connections constituted to deliver the release liquid into the tank in direction of flow of such release liquid, away from the location of liquid transfer from the tank to the proximate end portion of the tubular extension.

7. A motor vehicle as defined in claim 6, together with a control valve in the pressure liquid conduits to the motors constituted to control the rate of pressure liquid flow to said motors, and operator controlled means to actuate said control valve.

8. A rigid frame for a motor vehicle comprising in combination, a liquid receiving tank, lateral extensions secured to the side portions of the tank and extending laterally outwardly to drive wheel locations, positive displacement hydraulic drive motors secured to said extensions proximate to the drive wheel locations, said tank element including a forward tubular extension in substantial alignment with the bottom of the tank and in liquid communication with the interior of the tank, a platform in proximity to the front portion of such extension and means to secure such platform to such extension.

9. A frame as defined in claim 8, together with horizontal plates secured to the sides of the tubular extension throughout substantially the full length of said tubular extension and constituting reinforcing means for stiffening said tubular extension.

10. A motor vehicle including in combination a frame, drive wheels, a positive displacement pressure liquid actuated motor corresponding to each drive wheel, a driving connection between the rotor of each such motor and the corresponding drive wheel, including means to journal the drive wheel with respect to the frame, a prime-mover-pump unit including a positive displacement pump element, means to control the operation of said prime-mover-pump unit including means constituted to cause operation of such unit at substantially uniform speed with substantially uniform rate of pressure liquid displacement by said pump, means to vary the value of said uniform speed with corresponding variation of the rate of uniform displacement of the pressure liquid, pressure liquid supply conduits between the pump and the positive displacement motors, return liquid conduits between the motors and the pump, driver controlled means in connection with selected ones of said conduits for control of the rate of liquid flow between the pump and the motors; together with conduit and valve means between the pressure liquid supply conduits which are between the pump and the motors, and the return liquid conduits which are between the motors and the pump, constituted to transmit liquid displaced by the pump in excess of the rate of liquid flow through the motors, to the inlet side of the pump; wherein the driver controlled means which controls the rate of liquid flow between the pump means and the motors, includes reverse means constituted to select the direction of motor rotation of the drive motors and is constituted to discontinue flow of pressure liquid to said motors and also includes means constituted to discontinue flow of liquid through the conduits which are in connection with the motors, and comprises a valve including a movable valve element constituted when in one position to select motor rotation in one direction, and when in an opposite position to select motor rotation in the reverse direction, and when in an intermediate position constituted to discontinue flow of pressure liquid to the motors, and to discontinue flow of liquid through the conduits which are in connection with the motors, with lock of the motors against rotation, together with a pedal, means to mount said pedal to the frame for pedal movement to selected positions corresponding to said positions of the movable valve element, operative connections between the pedal and said movable valve element, and means to urge movement of the operative connections and the pedal to the intermediate position of the movable valve element, with simultaneous locking of the motors against rotation.

11. A motor vehicle as defined in claim 10, wherein the operative connections between the pedal and the movable valve element comprise a link and connections between said link and the pedal and between said link and the movable valve element.

12. A motor vehicle as defined in claim 11, wherein the means which urges movement of the operative connections and the pedal to the intermediate position, comprises spring means.

13. A motor vehicle as defined in claim 10, together with means to adjust the operative connections between the pedal and the movable valve element, constituted to cause pedal movement to a selected position when the movable valve element is in said intermediate position.

14. A motor vehicle including in combination a frame, drive wheels, a pressure liquid actuated motor corresponding to each drive wheel, a driving connection between the rotor of each such motor and the corresponding drive wheel, including means to journal the drive wheel with respect to the frame, a prime-mover-pump unit including a positive displacement pump element, means to control the operation of said prime-mover-pump unit including means constituted to cause operation of such unit at substantially uniform speed with substantially uniform rate of delivery of pressure liquid by said pump, together with means to supply pressure liquid to the motors and to return such liquid from the motors to the pump, including a regulator-divider unit having an inlet port, a regulated demand outlet port and a spillage port and also including manually adjustable valve means to control the rate of liquid flow to the regulated demand outlet port, and including means to automatically control the rate of flow of pressure liquid from the spillage port to an amount equal to the rate of pressure liquid delivery through the inlet port reduced by the rate of pressure liquid flow to the regulated demand outlet port, conduits between the pressure liquid delivery of the pump and the inlet port of the regulator-divider unit, conduits between the regulated demand outlet port of the regulator-divider unit and the motors, and conduits between the motors and the inlet to the pump for return of liquid to the pump together with other conduits connecting the spillage port to the inlet to the pump.

15. A motor vehicle as defined in claim 14, together with ancillary liquid pressure operated units in said last named conduits, and conduits from such ancillary liquid pressure operated units to the inlet of the pump.

16. A motor vehicle as defined in claim 15, wherein said ancillary liquid pressure operated units comprise liquid pressure operated implements.

17. A motor vehicle as defined in claim 14, together with means to vary the speed of the prime-mover-pump unit with corresponding variation of the rate of pressure liquid delivery to the inlet port of the regulator-divider unit.

18. A motor vehicle as defined in claim 14, together with means in the conduits between the regulator-divider unit regulated demand outlet port, and the motors, to control the rate of pressure liquid flow to such motors.

19. A motor vehicle as defined in claim 18, together with means to vary the speed of the prime-mover-pump unit with corresponding variation of the rate of pressure liquid delivery to the inlet port of the regulator-divider unit.

20. A motor vehicle as defined in claim 14, together with a second regulator-divider unit included in the pressure liquid delivery conduits which are between the pressure liquid delivery of the pump and the inlet port of the first mentioned regulator-divider unit, with the conduits from the pressure liquid delivery of the pump in connection with the inlet port of such second regulator-divider unit and the inlet port of the first-mentioned regulator-divider unit in conduit connection with the regulated demand outlet port of the second mentioned regulator-divider unit, a pressure liquid operated power-steering unit in the motor vehicle, conduits connecting the spillage port of such second regulator-divider unit with the inlet port of the pressure liquid operated power-steering unit, and conduits connecting the liquid delivery port of such power-steering unit with the inlet to the pump.

21. A motor vehicle as defined in claim 14, wherein there is included in the conduits between the motors and the inlet to the pump a tank for the operating liquid with the conduits from the motors in communication with the interior of such tank at one location, and with conduits to the inlet to the pump in communication with the interior of the tank at another location removed from the location of communication of the first mentioned conduits with the interior of the tank.

22. A motor vehicle as defined in claim 21, wherein the tank includes a longitudinal forwardly reaching extension substantially at the level of the bottom of the tank and reaching to a location proximate to the pump, and wherein the conduits to the inlet to the pump connect to said tank extension at such location which is proximate to the inlet to the pump.

23. A motor vehicle as defined in claim 14, together with a pressure liquid operated ancillary unit, pressure liquid and return liquid conduits in connection with such ancillary unit, and valve means included in the conduits which are between the pressure liquid delivery of the pump and the inlet port of the regulator-divider unit, said valve means including an inlet port and an outlet port in connection with the conduit which connects with the liquid delivery of the pump and with the inlet port of such regulator-divider unit, respectively, and said valve means including a second pair of ports and also including selector means to connect the inlet and outlet ports together for pressure liquid flow through such valve means, when such selector means is in one position, and to connect the inlet port to the first of the second pair of ports and the outlet port to the second of such second pair of ports, or to connect the inlet port to the second of such second pair of ports and the outlet port to the first of such second pair of ports, selectively, and connections of the pressure and return liquid conduits of the ancillary unit, with the second pair of ports of such valve means which is included in the conduits from the pump and to the inlet port of the regulator-divider unit.

24. A motor vehicle as defined in claim 14, together with a pressure liquid operated ancillary unit, pressure liquid and return conduits in connection with such ancillary unit, and valve means in connection with such ancillary unit, said valve means including an inlet port and an outlet port, conduits connecting the inlet port with the pressure liquid delivery of the pump, conduits connecting the outlet port with the inlet to the pump, a second pair of ports in such valve means which is in connection with the ancillary unit, said pressure and return conduits of the ancillary unit being in connection with said ports, and said valve means including selector means constituted when in one position to connect the inlet port and the outlet port to the ports of such second pair of ports in a first order of connections, and when in another position to connect the inlet port and the outlet port to the ports of such second pair of ports in a second order of connections, and when in a third position to seal both of the inlet and outlet ports against liquid flow therethrough.

25. A motor vehicle comprising in combination a frame, means to journal running wheels to said frame including two pairs of such wheels, one pair constituting a pair of steering wheels, the journals of said steering wheels including pintles pivoted for rock during the steering operations, a pressure liquid operated drive motor corresponding to each wheel, a driving connection between the rotor shaft of each such motor and the corresponding wheel, each motor including pressure liquid inlet, and return liquid outlet ports, at least two conduits in connection with said ports of each pair of wheel motors constituted for simultaneous supply of pressure liquid through a first selected conduit to the motors of such pair, and for release return of liquid through a second selected conduit from such pair of motors, and constituted for simultaneous drive of both motors of such pair in the same direction, a prime-mover-pump unit, means to mount the same on the frame, said pump including a pressure liquid supply port and a return release liquid port, selector valve means including two ports, one for pressure liquid supply, and another for release liquid return, conduits connecting said ports to the pressure liquid supply port and to the return release liquid port of the pump, and said selector valve means also including a pair of ports corresponding to each pair of conduits of a pair of motors, the conduits from each pair of motors being connected to the corresponding pair of ports of the selector valve means and the selector valve means also including a movable selector element movable into either of at least two motor drive selecting positions including a first defined parallel drive selecting position and a second defined series drive selecting position, and constituted when in the first defined position to establish connection of one conduit of each pair of motors with the pressure liquid supply port of the selector valve means and connection of the other conduit of each pair of motors with the release return liquid port of the selector valve means, and constituted when in the second defined position to establish connection of one conduit of one pair of motors with the pressure liquid supply port of the selector valve means and connection of one conduit of the other pair of motors with the release return liquid port of the selector valve means, and to establish connections between the other conduits of both pairs of motors.

26. A motor vehicle as defined in claim 25, wherein the movable selector element is movable to a third selecting position, being a third defined position to establish connection of the conduits of one pair of motors with the pressure liquid supply port of the selector valve means and with the release return liquid port of the selector valve means, and to establish connection between both of the conduits of the other pair of motors.

27. Means as defined in claim 25, together with reverser valve means included in the conduits which connect the two ports of the selector valve means which are for pressure liquid supply and for release liquid return, to the pressure liquid supply port and to the return release liquid port of the pump, said reverser valve means being constituted for supply of pressure liquid to either of the said ports of the selector valve means, and for return of release return liquid selectively.

28. A motor vehicle frame comprising in combination a cubical shaped liquid receiving tank, a forwardly extending tubular element having its rear end portion extending beneath the floor of the tank and in liquid transfer communication with the interior of the tank, means to secure such rear end portion securely to the tank floor, outwardly extending frame plates beneath the floor of the tank and extending outwardly at both sides of the medial plane of the tank, means to secure such frame plates to the tank floor, motor plates secured to the outer ends of such frame plates, a positive displacement hydraulic motor secured to the motor plate at each side of the vehicle with the drive shaft of such motor extending normal to the medial plane of the vehicle, and projecting outwardly beyond the corresponding motor plate, and constituting a drive wheel supporting and driving element, and a horizontal prime-mover-pump unit supporting platform secured to such tubular element and constituting the front portion of the vehicle frame.

References Cited by the Examiner

UNITED STATES PATENTS

| | | | |
|---|---|---|---|
| 732,908 | 7/1903 | Thomson | 180—66 X |
| 1,347,448 | 7/1920 | Evans | 280—410 |
| 1,642,103 | 9/1927 | Daurenmeyer | 180—66 |
| 1,963,091 | 6/1934 | Jenkins | 180—66 |
| 1,987,698 | 1/1935 | Montelius | 180—66 X |
| 2,167,848 | 8/1939 | Ostenberg | 180—70 X |
| 2,269,326 | 1/1942 | Wandscheer | 37—43 |
| 2,587,711 | 3/1952 | Dobeus | 180—1 |
| 2,598,538 | 5/1952 | Haynes | 180—66 X |
| 2,641,070 | 6/1953 | Bennett. | |
| 2,678,106 | 5/1954 | Vonderheide | 180—66 |
| 2,727,501 | 12/1955 | Worth | 60—19 X |
| 2,737,196 | 3/1956 | Eames | 137—101 |
| 2,753,191 | 7/1956 | Smith | 280—405 |
| 2,765,611 | 10/1956 | King | 56—25.4 |
| 2,766,834 | 10/1956 | Boyer | 56—25.4 X |
| 2,821,171 | 1/1958 | Charlson | 91—56 |
| 2,859,578 | 11/1958 | Hall | 56—25.4 |
| 2,904,957 | 9/1959 | Quayle | 60—19 |
| 2,910,085 | 10/1959 | Banker. | |
| 2,920,434 | 1/1960 | Ingram | 56—25.4 |
| 2,942,677 | 6/1960 | Gray | 180—66 X |
| 2,953,164 | 9/1960 | Haberland et al. | 56—25.4 |
| 3,008,531 | 11/1961 | Howard | 180—66 |
| 3,010,735 | 11/1961 | Larsen | 280—405 |
| 3,052,040 | 9/1962 | Fiske | 37—43 |
| 3,078,656 | 2/1963 | Jedrzykowski | 180—66 X |
| 3,098,574 | 7/1963 | De Marco | 180—66 |
| 3,125,110 | 3/1964 | Allen et al. | 137—101 |

FOREIGN PATENTS

| | | |
|---|---|---|
| 848,591 | 7/1939 | France. |
| 878,150 | 9/1942 | France. |
| 973,478 | 9/1950 | France. |

BENJAMIN HERSH, *Primary Examiner.*

A. HARRY LEVY, *Examiner.*

M. L. SMITH, *Assistant Examiner.*